(12) United States Patent
Adjabeng et al.

(10) Patent No.: US 11,047,602 B2
(45) Date of Patent: Jun. 29, 2021

(54) COMPACT CHILLER AND COOLER APPARATUSES, DEVICES AND SYSTEMS

(71) Applicant: Ecodyst, Inc., Apex, NC (US)

(72) Inventors: George Adjabeng, Apex, NC (US); Kwabena Williams, Durham, NC (US)

(73) Assignee: Ecodyst, Inc., Apex, NC (US)

( * ) Notice: Subject to any disclaimer, the term of this patent is extended or adjusted under 35 U.S.C. 154(b) by 115 days.

(21) Appl. No.: 15/573,042

(22) PCT Filed: Jun. 10, 2016

(86) PCT No.: PCT/US2016/036886
§ 371 (c)(1),
(2) Date: Feb. 9, 2018

(87) PCT Pub. No.: WO2016/201223
PCT Pub. Date: Feb. 15, 2016

(65) Prior Publication Data
US 2018/0209695 A1    Jul. 26, 2018

Related U.S. Application Data

(60) Provisional application No. 62/174,092, filed on Jun. 11, 2015.

(51) Int. Cl.
| | | |
|---|---|---|
| *F25B 1/00* | (2006.01) | |
| *B01D 5/00* | (2006.01) | |
| *F25B 25/00* | (2006.01) | |

(52) U.S. Cl.
CPC ............ *F25B 1/005* (2013.01); *B01D 5/0006* (2013.01); *F25B 25/005* (2013.01); *F25B 2400/071* (2013.01); *F28F 2280/02* (2013.01)

(58) Field of Classification Search
CPC .. F25B 1/005; F25B 2400/071; F25B 25/005; B01D 5/0006; F28F 2280/02
See application file for complete search history.

(56) References Cited

U.S. PATENT DOCUMENTS

| | | |
|---|---|---|
| D83,687 S | 3/1931 | Macready |
| D105,266 S | 7/1937 | Cranston, Jr. |
| (Continued) | | |

FOREIGN PATENT DOCUMENTS

| | | |
|---|---|---|
| CH | 655014 A5 | 3/1986 |
| CN | 101402900 A | 4/2009 |
| (Continued) | | |

OTHER PUBLICATIONS

Non-Final Office Action for U.S. Appl. No. 15/322,943 dated Sep. 4, 2018.

(Continued)

*Primary Examiner* — Ana M Vazquez
(74) *Attorney, Agent, or Firm* — Jenkins, Wilson, Taylor & Hunt, P.A.

(57) ABSTRACT

Provided herein are compact chiller and cooler apparatuses, devices and systems. Chiller apparatuses disclosed herein include a refrigeration system contained in a central housing with an external heat exchanger or "cold finger" designed to be universally applicable to cooling various sizes and configurations of water baths and laboratory applications needing a cooling capacity. Chiller apparatuses disclosed herein are designed to be universally used with rotary evaporators, vacuum ovens, centrifugal concentrators and freeze dryers.

7 Claims, 16 Drawing Sheets

(56) References Cited

U.S. PATENT DOCUMENTS

| | | |
|---|---|---|
| 2,128,784 A | 8/1938 | Tull et al. |
| 2,566,865 A | 9/1951 | Wingerter |
| D218,069 S | 7/1970 | Cornelius et al. |
| 4,239,484 A | 12/1980 | Schuster |
| D261,890 S | 11/1981 | Caspersen |
| D265,653 S | 8/1982 | Arzberger et al. |
| 4,370,046 A | 1/1983 | Van Bouwel et al. |
| D309,395 S | 7/1990 | Thompson et al. |
| D317,694 S | 6/1991 | Dust |
| D328,995 S | 9/1992 | Verheijen |
| D332,200 S | 1/1993 | Credle, Jr. |
| 5,181,559 A | 1/1993 | Svoboda |
| 5,211,808 A | 5/1993 | Vilardi et al. |
| D344,527 S | 2/1994 | Drago et al. |
| 5,340,444 A | 8/1994 | van der Heijden |
| D351,965 S | 11/1994 | Credle, Jr. |
| 5,365,750 A | 11/1994 | Greenthal |
| D358,290 S | 5/1995 | Schroeder |
| D365,962 S | 1/1996 | Amundsen et al. |
| D375,650 S | 11/1996 | Saito et al. |
| 5,584,187 A | 12/1996 | Whaley |
| 5,916,351 A | 6/1999 | Sintchak |
| 5,919,339 A | 7/1999 | Ikeda |
| 5,937,662 A | 8/1999 | Schulak et al. |
| 6,461,287 B1 | 10/2002 | Glater |
| 6,658,875 B2 | 12/2003 | Weng |
| D503,785 S | 4/2005 | Otaki |
| D503,786 S | 4/2005 | Otaki |
| D503,971 S | 4/2005 | Otaki |
| D522,114 S | 5/2006 | Otaki |
| D600,492 S | 9/2009 | Hammad et al. |
| 7,713,421 B2 | 5/2010 | Galbraith |
| D669,154 S | 10/2012 | Choi |
| 9,005,403 B2 | 4/2015 | Adjabeng |
| D735,527 S | 8/2015 | Palermo et al. |
| D750,209 S | 2/2016 | Satou |
| D760,305 S | 6/2016 | Salin |
| D803,276 S | 11/2017 | Adjabeng et al. |
| 10,307,688 B2 | 6/2019 | Adjabeng |
| 10,898,828 B2 | 1/2021 | Adjabeng |
| 2009/0314324 A1 | 12/2009 | Murai et al. |
| 2011/0073459 A1 | 3/2011 | Adjabeng |
| 2013/0153397 A1 | 6/2013 | Carl et al. |
| 2014/0144767 A1 | 5/2014 | Jost et al. |
| 2016/0146519 A1 | 5/2016 | Ito |
| 2017/0252668 A1 | 9/2017 | Adjabeng |
| 2019/0351348 A1 | 11/2019 | Adjabeng |

FOREIGN PATENT DOCUMENTS

| | | |
|---|---|---|
| CN | 103391800 A | 11/2013 |
| CN | 203556155 U | 4/2014 |
| CN | 103889528 A | 6/2014 |
| CN | 203816660 U | 9/2014 |
| CN | 204202354 U | 3/2015 |
| CN | 106999793 B | 10/2020 |
| DE | 3 248 501 A1 | 7/1984 |
| DE | 3 726 669 A1 | 2/1989 |
| DE | 4 231 458 A1 | 3/1994 |
| DE | 203 00 046 U1 | 5/2003 |
| EP | 2 810 566 A1 | 12/2014 |
| EP | 3223926 A1 | 10/2017 |
| EP | 3307411 | 4/2018 |
| JP | S5813458 U | 1/1983 |
| JP | S58132502 U | 9/1983 |
| JP | S6451181 U | 3/1989 |
| JP | H 09168701 A | 6/1997 |
| JP | H 09209934 A | 8/1997 |
| JP | 2000 279703 A | 10/2000 |
| JP | 2009 106819 A | 5/2009 |
| JP | 6633657 B2 | 1/2020 |
| JP | 6759205 B2 | 9/2020 |
| WO | WO 2005/113100 A1 | 12/2005 |
| WO | WO 2016/086101 A1 | 6/2016 |

OTHER PUBLICATIONS

Notice of Allowance for U.S. Appl. No. 15/322,943 dated Jan. 18, 2019.
Extended European Search Report with Supplementary European Search Report for European Patent Application No. 16808371.5 dated Jan. 28, 2019. [dated Feb. 5, 2019].
Office Action and Search Report corresponding to Chinese Patent Application No. 2015800641130 dated Jan. 28, 2019.
Extended Europeam Search Report and Search Opinion for Application No. EP 15 86 2685 dated Jul. 3, 2018.
Notice of Publication for European Application No. 16808371.5 dated Mar. 21, 2018.
Danfoss A/S, "ELIMINATOR® filter drier: Why you need a filter drier in your system," Mar. 2013 [Retrieved from the Internet on Jan. 6, 2015] <URL:http://www.danfoss.com/NR/rdonlyres/F7D20FF8-CE64-48BC-9EFC-00C66A4901C2/0/FilterdrierinHVACRsystem. pdf>; p. 1.
Frank, P, "Schlenk Line Deisgn and Safety," Apr. 4, 2011, Stanford University [Retrieved from the Internet on Jan. 6, 2015] >URL:http://operatingexperience.doe-hss.wikispaces.net/file/view/Schlenk+Line+Safety.pdf>; pp. 2-3.
International Search Report and Written Opinion for Application No. PCT/US15/62615 dated Feb. 5, 2016.
International Search Report and Written Opinion for Application No. PCT/US16/36886 dated Sep. 7, 2016.
KNF Meuberger Inc. "Rotary Evaporator RC 900" Sep. 2014 [Retrieved from the Internet on Jan. 6, 2015] <URL:http://www.knfusa.com/fileadmin/user_upload/PDF/US/Data_sheets/Updated_Datasheets/KNFUSA-Datasheet-RC900.pdf>; p. 2.
Restriction Requirement for U.S. Appl. No. 29/547,529 dated Mar. 10, 2017.
Notice of Allowance for U.S. Appl. No. 29/547,529 dated Jul. 31, 2017.
EchoChyll, Ecodyst, Inc., <https://www.youtube.com/watch?v=hTJxYVHyLOM>, 0:00-0:30, dated Jun. 27, 2016.
"EcoChyll is a Rotary Evaporator Accessory that Offers Superior Advantage," Ecodyst, <http://www.ecodyst.com/>, pp. 1, 3, retrieved on Jul. 14, 2017.
Reisch, M.S., "How One Entrepreneur Is Making Rotary Evaporators Cool Again," Chemical & Engineering News, vol. 94, Iss. 5, pp. 22-23, <http://cen.acs.org/articles/94/i5/One-Entrepreneur-Making-Rotary-Evaporators.html?h=684544369> dated Feb. 1, 2016.
Notice of Publication for European Application No. 15862685 dated Sep. 6, 2017.
Notice of Publication corresponding to U.S. Appl. No. 16/429,150 dated Nov. 21, 2019.
Notice of Reason for Refusal for Japanese Application No. 2017528953 dated Sep. 17, 2019.
Office Action corresponding to European Application No. 15862685.3 dated Apr. 8, 2019.
Office Action corresponding to Chinese Application No. 2016800339978 dated Sep. 6, 2019.
Office Action corresponding to Japanese Parent Application No. 2017564504 dated May 28, 2019.
Office Action (Decision to Grant) corresponding to Japanese Patent Application No. 2017564503 dated Nov. 12, 2019.
Office Action corresponding to Chinese Application No. 2015800641130 dated Sep. 29, 2019.
Office Action corresponding to European Application No. 16808371.5 dated Oct. 29, 2019.
Office Action corresponding to U.S. Appl. No. 16/429,150 dated Jan. 10, 2020.
Office Action corresponding to Chinese Patent Application No. 201680033997.8 dated May 12, 2020.
Decision to Grant corresponding to Chinese Patent Application No. 201580064113.0 dated Jul. 30, 2020.
Decision to Grant corresponding to Japanese Patent Application No. 2017-528953 dated Aug. 4, 2020.
Notification of Correction to Decision to Grant corresponding to Chinese Patent Application No. 201580064113.0 dated Aug. 10, 2020.

(56) References Cited

OTHER PUBLICATIONS

Notice of Allowance for U.S. Appl. No. 16/429,150 dated Sep. 24, 2020.
Oral Summons corresponding to European Patent Application No. 15862685.3 dated Jul. 30, 2020.
Notice of Allowability for U.S. Appl. No. 16/429,150 dated Nov. 20, 2020.
Office Action corresponding to European Patent Application No. 15862685.3 dated Nov. 29, 2019.
Office Action corresponding to Chinese Patent Application No. 201680033997.8 dated Jan. 15, 2021.

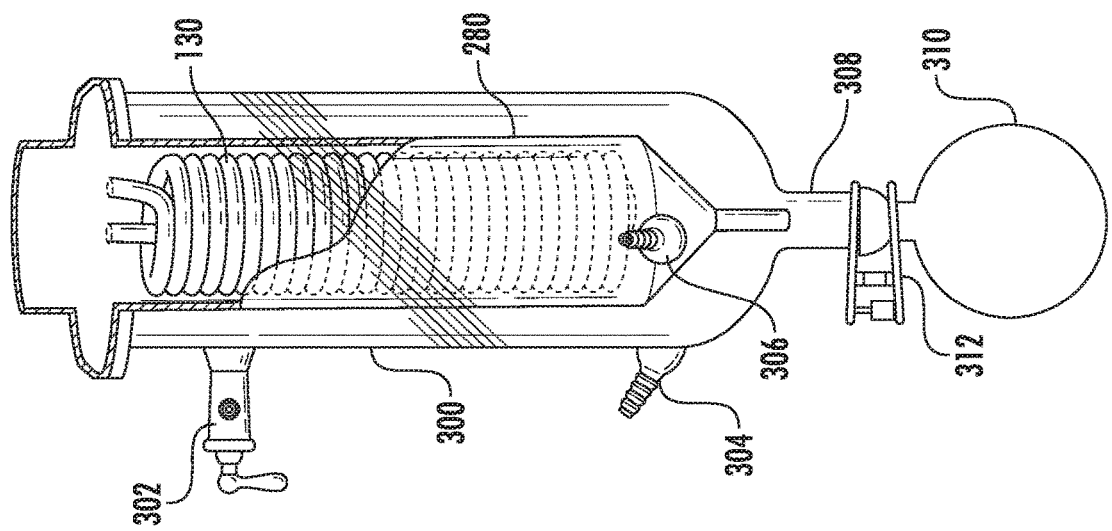
FIG. 7D
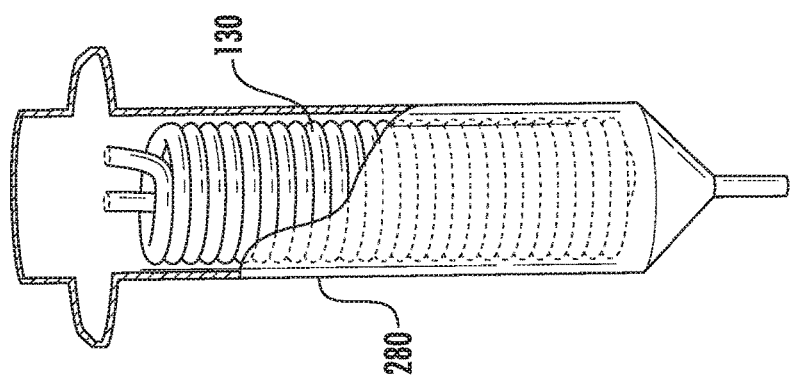
FIG. 7C
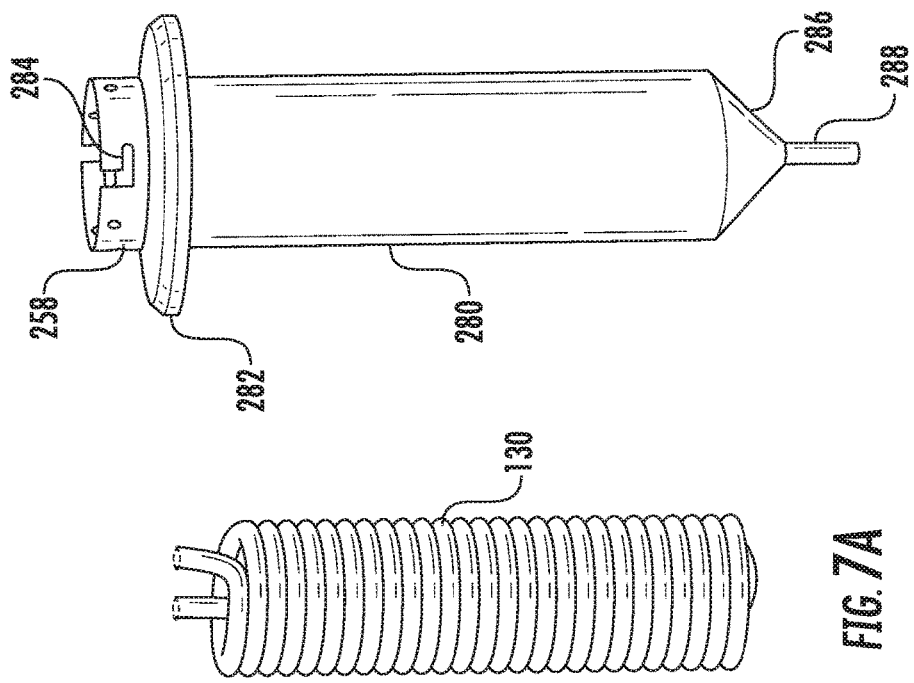
FIG. 7B
FIG. 7A

COMPACT CHILLER AND COOLER APPARATUSES, DEVICES AND SYSTEMS

CROSS REFERENCE TO RELATED APPLICATIONS

This application claims the benefit of and priority to PCT International Patent Application No. PCT/US2016/036886, filed Jun. 10, 2016, which claims the benefit of and priority to U.S. Provisional Patent Application Ser. No. 62/174,092, filed Jun. 11, 2015, the disclosures of which are incorporated herein by reference in their entirety.

TECHNICAL FIELD

The presently disclosed subject matter relates to compact chiller and cooler apparatuses, devices and systems. The presently disclosed subject matter also relates to the use of such compact chiller and cooler apparatuses, devices and systems.

BACKGROUND

Chilling or cooling devices are used in laboratories and industries throughout the world, such as for cooling semiconductor equipment, medical equipment, medical and industrial lasers, electron microscopes, analytical instrumentation, and printing equipment. Other applications include plastics processing and testing, cryogenic testing, biological applications, pharmaceutical synthesis, and chemical synthesis. Additionally, chillers are used to provide cooling for rotary evaporators, a device used in chemical laboratories to remove solvents from samples by evaporation and in molecular cooking for the preparation of distillates and extracts.

Conventional chillers are often described as all in one packages with respect to system integration and control. That is, all the components are packaged in one housing. Unfortunately, all in one package chillers can be bulky, heavy and complex, which limits their widespread use. Integrating a cooling system, reservoir, and temperature controller has resulted in many versions of chillers that essentially deliver the same cooling functionality.

Some components of a chiller can remain relatively the same, but the reservoir (or tank) volume and/or size often vary. Thus, conventional chillers with the same cooling functionality can have widely varying reservoir capacities, which affects the overall size, weight and price of varying chiller models. For example, two chillers having the same cooling capacity can vary significantly in size and weight, e.g. 550 pounds for a large capacity chiller compared to 150 pounds for a smaller tank chiller. Based on current designs, the reservoir capacity for each chiller is fixed. Thus, a user that purchases a 4.5 L model but later has a need for a larger capacity reservoir will have no other option than to purchase a more expensive, bulkier, and heavier chiller with a larger reservoir. This is not economical particularly when the cooling functionality remains essentially the same.

Chillers have proven valuable for use in laboratories and industries. They are generally considered environmentally friendly and water saving laboratory devices to cool, for example, a rotary evaporator. However, what is needed is chiller designs and systems that provide sufficient cooling capabilities that are cost effective and easy to use. It would be advantageous to reduce size, weight and complexity, improve cooling temperature ranges and cooling functions of chillers. Additionally, chiller designs that are multifunctional, flexible and easier to use are needed, particularly where improved functionalities can be realized. Laboratory space is a premium and chiller designs that are compact and have a small footprint are needed. Compact and lighter-weight chiller designs solve the persistent issue of limited bench space, and the frequent movement of chillers within a laboratory, or from laboratory to laboratory. Such advantages, and others disclosed herein, are provided by the instant disclosure.

SUMMARY

The presently disclosed subject matter provides compact chiller and cooler apparatuses, devices and systems configured to operate efficiently while taking up less space.

Provided in some embodiments is a chiller apparatus configured to cool a liquid, vapor or other medium, comprising a condenser, a compressor, a temperature controller, and a heat exchanger, wherein the condenser, compressor and temperature controller are contained inside a housing, wherein the heat exchanger is external to the housing, wherein the heat exchanger is configured to be exposed to a liquid, vapor or other medium in a vessel, and from which heat is to be removed by the heat exchanger, wherein the condenser, compressor, temperature controller and heat exchanger are integrated into a single stand alone chiller apparatus, and wherein the chiller is configured to be universally used with any vessel containing liquids, vapors or other medium to be cooled. In some embodiments, the heat exchanger is positioned outside of the housing but affixed to the housing and configured to be submerged or placed in the vessel. In some embodiments, the chiller can further comprise a pump configured to be attachable to a vessel containing the liquids, vapors or other medium to be cooled, wherein the pump is configured to circulate the liquids, vapors or other medium in the vessel. In some embodiments, the chiller can further comprise a vacuum pump and controller.

In some embodiments, the heat exchanger, condenser and compressor further comprise a refrigerant, and wherein the heat exchanger, condenser and compressor are in fluid communication with one another and configured to circulate the refrigerant. In some embodiments, the heat exchanger is configured as a condenser for use with a rotary evaporator. In some embodiments, the heat exchanger is configured to be placed in a vessel comprising a circulating water bath or reaction bath.

In some embodiments, the chillers provided herein can further comprise a pump outside the chiller housing, wherein the pump is equipped with a detachable reservoir, wherein the pump is configured as a support structure for the reservoir, and wherein the heat exchanger is configured to be placed in the reservoir.

In some embodiments, the chillers provided herein can further comprise a double-walled vessel surrounding the heat exchanger. In some embodiments, the heat exchanger comprises an evaporator coil. In some embodiments, the evaporator coil comprises a titanium alloy. In some embodiments, the evaporator coil comprises stainless steel. In some embodiments, the evaporator coil comprises a copper pipe.

In some embodiments, a plurality of heat exchangers external to the housing and affixed to the housing can be provided.

In some embodiments, the chiller is tankless and is configured with a heat exchanger configured for contact and cool a liquid, vapor or other medium in a vessel detached from the chiller. In some embodiments, the vessel comprises an enclosed tank, open container, sealed vessel, double-walled vessel, conduit, and/or water bath. In some embodiments, the vessel comprises any size, volume and/or configuration so long as the liquid, vapor or other medium to be cooled comes into contact with the heat exchanger.

In some embodiments, a chiller as provided herein can further comprise a rotary evaporator, wherein the chiller is configured to condense an evaporate from the rotary evaporator. In some embodiments, a chiller as provided herein can further comprise a vacuum oven, wherein the chiller is configured to attach to and cool the vacuum oven. In some embodiments, a chiller as provided herein can further comprise a centrifugal concentrator, wherein the chiller is configured to attach to and cool the centrifugal concentrator. In some embodiments, a chiller as provided herein can further comprise a freeze dryer, wherein the chiller is configured to attach to and cool the freeze dryer.

In some embodiments, the heat exchanger can comprise a coolant coil and a chemical-resistant sleeve surrounding the coolant coil, wherein the coolant coil is configured to circulate a coolant from a refrigeration system to thereby cool a surface of the chemical-resistant sleeve. In some embodiments, a chemical-resistant sleeve can comprise a substantially cylindrical sleeve having an opening at a first end to receive the coolant coil.

In some embodiments, the chemical-resistant sleeve can comprise an inner cavity extending from a second end, wherein the inner cavity is configured to extend inside the coolant coil when the coolant coil resides in the substantially cylindrical sleeve. In some embodiments, the chemical-resistant sleeve comprises one or more structures extending from a surface of the chemical-resistant sleeve to increase a cooling surface area of the heat exchanger.

In some embodiments provided herein are chiller systems comprising a chiller apparatus configured to cool a liquid and a separate reservoir, the chiller apparatus comprising a condenser, a compressor, a temperature controller, and a heat exchanger, wherein the condenser, compressor and temperature controller are contained inside a housing, wherein the heat exchanger is external to the housing, wherein the heat exchanger is configured to be exposed to a liquid from which heat is to be removed by the heat exchanger, and the separate reservoir comprising a vessel configured to contain a liquid, wherein the reservoir is configured to place the liquid in contact with the heat exchanger, wherein the reservoir is separate from the chiller apparatus, and wherein the chiller apparatus is configured to be universally used with a separate reservoir of any size, volume or configuration provided that the separate reservoir positions the liquid to be in contact with the heat exchanger. In some embodiments, the chiller system can further comprise a plurality of separate reservoirs, wherein the plurality of separate reservoirs vary in size and/or liquid capacity but are configured to position the liquid in contact with the heat exchanger. In some embodiments, the reservoir further comprises a pump configured to circulate the liquid.

An object of the presently disclosed subject matter having been stated hereinabove, and which is achieved in whole or in part by the presently disclosed subject matter, other objects will become evident as the description proceeds when taken in connection with the accompanying Examples as best described hereinbelow.

BRIEF DESCRIPTION OF THE DRAWINGS

The presently disclosed subject matter can be better understood by referring to the following figures. The components in the figures are not necessarily to scale, emphasis instead being placed upon illustrating the principles of the presently disclosed subject matter (often schematically). In the figures, like reference numerals designate corresponding parts throughout the different views. A further understanding of the presently disclosed subject matter can be obtained by reference to an embodiment set forth in the illustrations of the accompanying drawings. Although the illustrated embodiment is merely exemplary of systems for carrying out the presently disclosed subject matter, both the organization and method of operation of the presently disclosed subject matter, in general, together with further objectives and advantages thereof, may be more easily understood by reference to the drawings and the following description. The drawings are not intended to limit the scope of this presently disclosed subject matter, which is set forth with particularity in the claims as appended or as subsequently amended, but merely to clarify and exemplify the presently disclosed subject matter.

For a more complete understanding of the presently disclosed subject matter, reference is now made to the following drawings in which:

FIGS. 7A through 7D are perspective and partial cut-away views of components of heat exchanger apparatuses as disclosed herein;

DETAILED DESCRIPTION

Figure 1:
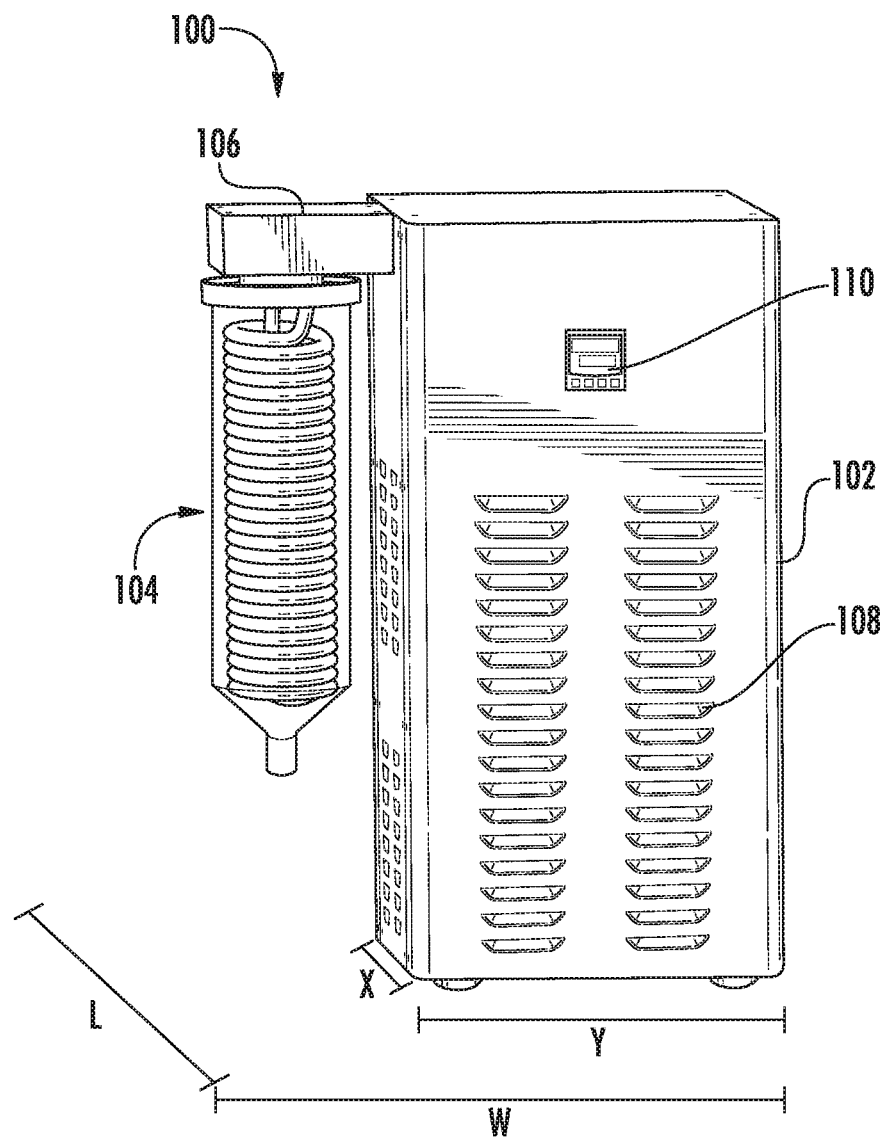
FIG. 1 is a perspective view of one embodiment of a chiller as disclosed herein.

Chillers are refrigerated cooling systems that generally include a compressor, condenser, evaporator, pump, reservoir, and temperature controller. Chillers cool down samples or processes by removing heat from one element and transferring it to another. Chillers are often referred to as recirculating chillers or coolers, which describe cooling liquid or medium (coolant) that is pumped through the system to be cooled and returned to the chiller.

Provided herein are chillers, also referred to as recirculating chillers, circulating coolers, circulators, and the like. In some embodiments, provided herein are chillers that comprise a compressor, condenser, heat exchanger (or evaporator), and/or temperature controller. In some embodiments such chillers are configured in a compact design. That is, in some aspects a chiller as provided herein can comprise a fully integrated "tankless" chiller apparatus with all components required for operation in a compact design, except the tank or reservoir for recirculated fluid/medium (coolant). The reservoir is not included in the chiller housing in some aspects but is instead a separate component such that the chiller itself is a separate and universal standalone piece of equipment that is not limited by the size/capacity/configuration of the reservoir, and can be configured to be used with a plurality of reservoir sizes, configurations and capacities in a multitude of applications.

In some embodiments chiller designs having the heat exchanger outside the main housing provides advantages over traditional recirculating chillers. For example, where the heat exchanger is inside the housing the chiller has limited uses and a fixed reservoir capacity. Cooled liquid must be circulated and the heat exchanger cannot be used for other activities like cooling reactions. Nor can such a configuration be used as a circulator bath. When the heat exchanger is inside the housing this means that separate instruments are needed for circulating chillers, circulating baths, immersion coolers, etc. This approach can be expensive, and can take up too much precious lab space and waste limited resources.

Conversely, chillers configured with the heat exchanger on the outside of the housing, as disclosed herein, can be used directly as a condenser in rotary evaporators, and/or to cool centrifugal concentrators, vacuum ovens, freeze dryers, gel dryers, DNA sample concentration applications, acid sample concentrations, and the like. In the case of rotary evaporators, for example, no coolant or circulating water is required. Vapors can be condensed directly on the heat exchanger. In some embodiments refrigerant inside the heat exchanger pipes or cooling lines can be configured to cool the pipes or cooling lines which in turn removes heat from the environment surrounding the heat exchanger, e.g. the evaporate.

Moreover, a tankless chiller, or one with a heat exchanger on the exterior of the housing, can provide for numerous and flexible uses. Any size reservoir, reaction vessels (to cool down or warm experiments), or circulator baths (to cool down or warm samples placed in the bath) can be used as well. Moreover, it is cheaper for researchers, clinicians or technicians to purchase various size reservoirs, circulating baths, etc., to use with one chiller than purchasing multiple chillers, separate circulator baths and an immersion cooler (used to cool down reactions). By housing the heat exchanger/evaporator outside the housing the disclosed chillers can in some embodiments be used in place of at least four pieces of equipment (circulating chillers, circulating baths, rotary evaporator condensers, and immersion coolers). Such a configuration provides significant advantages in cost savings and conservation of lab space.

In some embodiments, the disclosed chillers can improve cooling performance over existing cooling devices. For example, the cooling capability can be improved such as in applications that no longer require a coolant/circulating fluid, e.g. in rotary evaporators. In traditional chillers the coolant/circulating fluid is pumped through hoses from the chiller to the rotary evaporator condenser. Such coolant that is transported through these hoses can get warm, or at least warmer, by the time it reaches the condenser as it absorbs heat from the ambient surroundings. Such is not the case in the disclosed chiller designs.

Chiller apparatuses provided herein can in some embodiments comprise integrated cooling systems, such as for example a cooling system and a pump. Such chiller apparatus can further comprise a heat exchanger/evaporator positioned outside the housing of the compressor so that the heat exchanger/evaporator can be submerged or soaked in a reservoir or bath to remove heat from a liquid or medium within the reservoir or bath, or otherwise exposed to a coolant fluid, liquid, vapor or other cooling medium.

In some embodiments, the disclosed chillers can comprise a refrigeration system, including refrigeration lines, such as copper lines, through which refrigerant, e.g. chlorofluorocarbons, can pass, and a receiving tank, compressor, refrigeration condenser and dryer. The refrigeration lines can be connected to a heat exchanger in the condenser unit that provides a cooling surface for use in a water bath, reservoir, rotary evaporator or any other suitable environment desired to be cooled and capable of coming into contact with the heat exchanger. In some embodiments a cooling coil, which can be exposed, or in some embodiments concealed in a chemically-resistant vapor trap or sleeve made of titanium (including commercial pure grade titanium), stainless steel, metal alloys, plastic, glass, rubber, such as neoprene rubber, and/or combinations thereof, can be fluidly connected to the refrigeration lines. In some embodiments titanium is used in the sleeve due to its robust chemical resistance. The condenser unit in some embodiments can comprise a cooling coil chamber that is cooled by direct expansion of refrigerant in the refrigeration lines. In some embodiments, the heat exchanger can comprise a copper coil through which cooled refrigerant passes, and which is encased in a titanium sleeve. In some embodiments, the heat exchanger can comprise a coil that is double looped and not encased in a sleeve such that vapors or cooling media are exposed to an increased surface area on the cooled coils. In such embodiments the double coils can comprise stainless steel, titanium, and/or a combination thereof. In some embodiments, the chiller, including mechanical refrigeration system, can be mechanically linked to and fixed with the heat exchanger/condenser such that the two are provided in a single unitary device.

In some embodiments the heat exchanger can comprise a cooling coil in fluid communication with the refrigeration system. The heat exchanger can comprise a titanium sleeve surrounding the cooling coil, whereby the titanium sleeve is cooled by the cooling coil, wherein the environment, e.g. a cooling fluid in a water bath or evaporate from a rotary evaporator, around the titanium sleeve is cooled. The condenser can comprise metal alloy sleeve surrounding the cooling coil, whereby the metal alloy sleeve is cooled by the cooling coil.

In some aspects, a detachable reservoir, in some embodiments integrated with a pump or other means for providing a pressure/circulating capacity, can be provided. Such a reservoir can in some embodiments be attached to a pump hose or conduit at one end of the hose or conduit, and the other end of the hose or conduit to the reservoir at a point that liquid or cooling media in the reservoir can be pumped to systems be cooled.

In some aspects, each of the components above, including a compressor for the refrigeration system and a pump, can be integrated into one stand alone or all-in-one system with one or more heat exchangers/evaporators. Without a built-in reservoir or water bath such stand alone or all-in-one system chillers can be more compact than existing chiller systems. Such a compact configuration can make the disclosed chillers more portable and space saving.

A stand alone chiller apparatus as disclosed herein can in some embodiments comprise one or more compressors, a condenser, a temperature controller, a receiver tank, an evaporator that can be positioned in a reservoir liquid or other vessels and configured to remove heat from a liquid or medium, an external reservoir or a vessel into which the evaporator can be positioned or submerged; and/or a pump or other mechanical apparatus to pump a cooled liquid or other medium in the reservoir to the systems to be cooled or for vacuum distillation.

In some embodiments, the heat exchanger/evaporator can be fitted with a condenser of a distillation apparatus like a rotary evaporator, such as for example that disclosed in U.S. Pat. No. 9,005,403, which is incorporated herein by reference in its entirety. In yet other embodiments, the chiller apparatus can comprise an integrated vacuum pump and controller. In some aspects more than one rotary evaporator can be connected to one chiller.

In some embodiments, a cooling temperature range for the disclosed chillers can range from about +40° C. to about −45° C., about +40° C. to about −100° C., or about +40° C. to about −150° C. Desired temperatures can be achieved through refrigeration engineering and/or refrigerant selection.

Turning now to the figures, FIG. 1 is a perspective view of a compact multifunctional chiller 100 as disclosed herein. As depicted in FIG. 1, chiller 100 can comprise a housing 102 with a heat exchanger 104 connected to but extending from housing 102. Chiller 100, and internal components discussed below, can be configured in such as way as to be integrated into a single device or apparatus that is configured to compactly arrange the elements in such a way that provides for an effective and efficient cooling/chilling system while minimizing the operational area and/or footprint. For example, the footprint or operational area of chiller 100 can be defined by the length L, width W, and/or combination thereof (area in square inches for example) of the outer dimensions of the apparatus. Alternatively, or in addition, the footprint or operational area of chiller 100 can be defined by the length X, width Y, and/or combination thereof (area in square inches for example) of the dimensions of housing 102. By way of example and not limitation, the footprint of traditional or existing chillers is about 300 to about 500 square inches, with some designs having an about 368 square inch footprint. For example, some existing chillers can have dimensions (W×H×D) of about 15.8×22.8×19.7 inches, about 15.8×26.0×19.7 inches, about 19.7×29.9×25.2 inches, or about 30.7×33.5×58.3 inches. In contrast, the presently disclosed chiller apparatuses, can in some embodiments comprise a total footprint or operational area of about 18.7×10 inches (L×W in FIG. 1), or about 150 square inches to about 350 square inches. In some embodiments the disclosed chillers can comprise a housing 102 footprint of about 12×10 inches (length X by width Y, in FIG. 1, or about 150 square inches to about 350 square inches In some embodiments a chiller as disclosed herein can be about 12×10×26 (L×W×H) inches in size.

Housing 102 can comprise a substantially rectangular or square or other suitable shape, box-like structure with four sides, a top and bottom. Housing 102 can be configured to fully, or substantially fully, enclose the mechanical or working components of chiller 100, except for heat exchanger 104. In some embodiments chiller 100 can comprise a heat exchanger arm 106 extending substantially horizontally from housing 102 and configured to support and mechanically connect heat exchanger 104 to chiller 100. Heat exchanger 104 can be attached to heat exchanger arm 106 by a clamp or other attachment mechanism, e.g. threads, screws, bolts, pressure fitting, etc. In some embodiments housing 102 can comprise a sheet metal or other suitable material, e.g. plastic, fiberglass, aluminum, etc., sufficiently rigid to maintain its structure and encase chiller 100, and also withstand extended use in a laboratory or field setting.

In some embodiments housing 102 can optionally comprise ventilation grates 108, louvers or other suitable ventilation structures configured to permit air circulation within the interior of housing 102 and around the refrigeration system housed therein. In some aspects chiller 100 can also comprise a control panel 110 conveniently located, such as on an outer surface of housing 102, such that a user can manipulate control panel 110 to facilitate operation of chiller 100. Control panel 110 can in some embodiments comprise a touch-screen or other electronic controller. Control panel 110 can in some embodiments comprise a temperature controller configured to control and/or regulate a temperature of a medium and/or the heat exchanger.

Figure 2A:
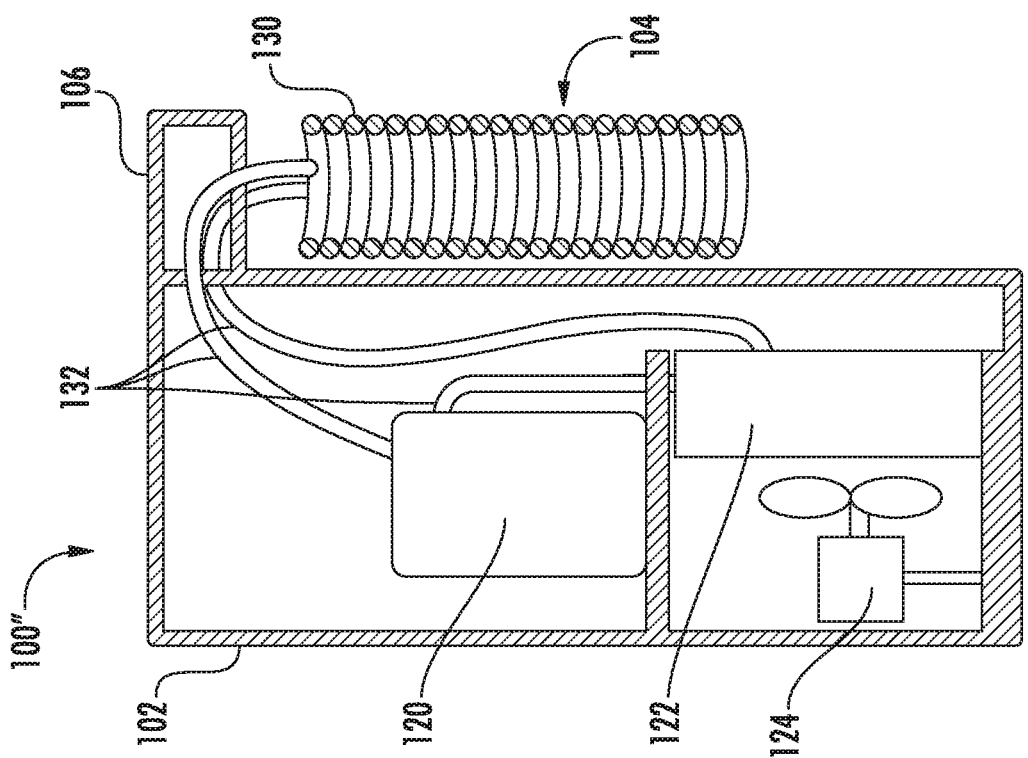
FIGS. 2A and 2B are cross-sectional schematic views of two embodiments of chiller apparatuses as disclosed herein.
Figure 2B:
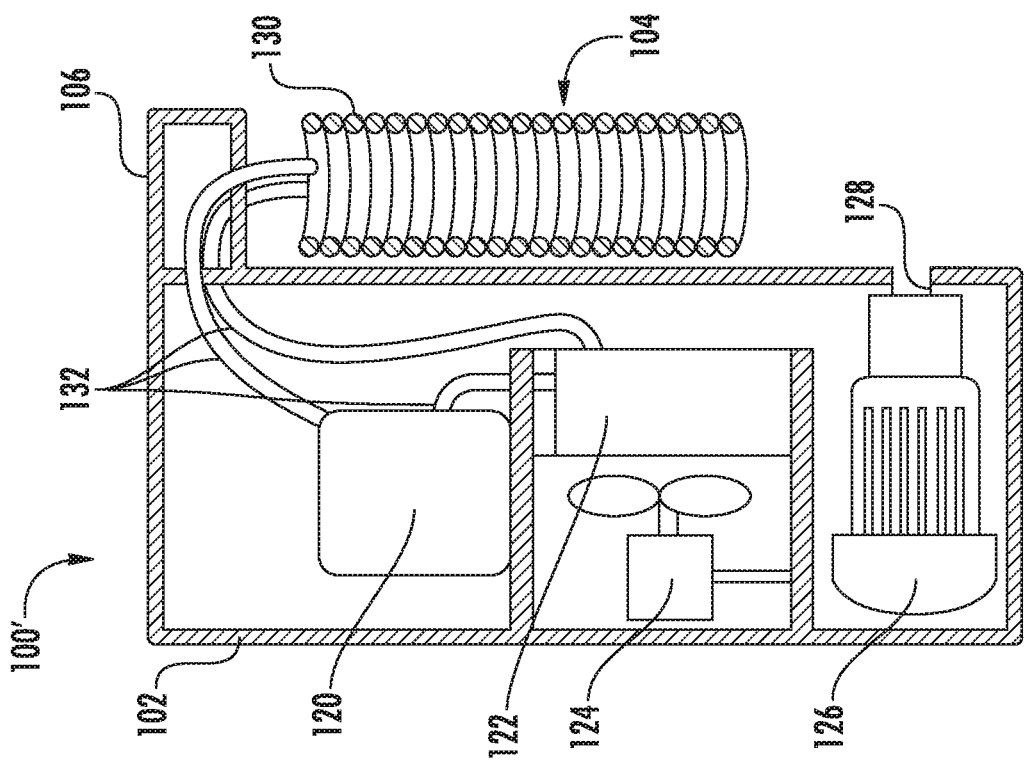

FIGS. 2A and 2B are schematics illustrations of the internal working components of chiller 100. Chiller 100 can comprise an integrated refrigeration system housed within housing 102 and continuing through heat exchanger arm 106 to provide a cooled refrigerant to heat exchanger coil 104. As shown in these cut-away views chiller 100 can comprise a compressor 120, refrigeration condenser 122 and fan 126. In some embodiments a refrigeration dryer may also be included. In some embodiments compressor 120, refrigeration condenser 122 and heat exchanger coil 104 (and optionally dryer) can be connected by refrigeration lines 132 (copper tubing) by feeding through heat exchanger arm 106. Heat exchanger 104 can comprise single or double coiled lines 130 connected to refrigeration lines 132 fed through heat exchanger arm 106. Thus, refrigeration coolant can pass through the refrigeration system (e.g. compressor 120, refrigeration condenser 122) and into coiled lines 130 of heat exchanger 104 in a closed or continuous circuit such that heat absorbed by heat exchanger 104 from a surrounding media, e.g. cooling liquid or vapors, can be removed by the refrigeration system to thereby cool the surrounding media.

FIGS. 2A and 2B depict similar chillers 100' and 100", respectively, both of which are optional configurations of chiller 100 of FIG. 1. Chiller 100' in FIG. 2A includes a pump 126 whereas chiller 100" does not. In some embodiments, such as in chiller 100', pump 126 can be configured to provided a pumping or pressurization capacity for a reservoir, water bath or reaction vessel to be used with the chiller. Having a pump built in to the chiller provides an additional functional feature that can be used to circulate a cooling media in a reservoir, water bath (FIG. 3A) or reaction vessel as needed. However, in some embodiments, such as in chiller 100" no pump 126 is provided since in some embodiments no pump is needed, such as for example when used with a rotary distillation apparatus, or a water bath with built-in circulating capabilities (FIG. 3B).

Figure 3A:
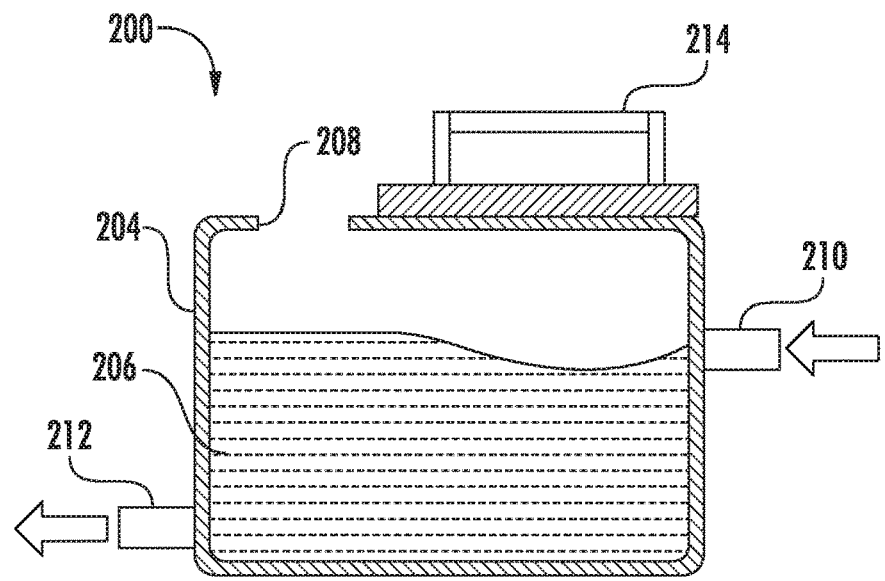
FIGS. 3A and 3B are cross-sectional schematic views of two embodiments of water bath devices as disclosed herein.
Figure 3B:
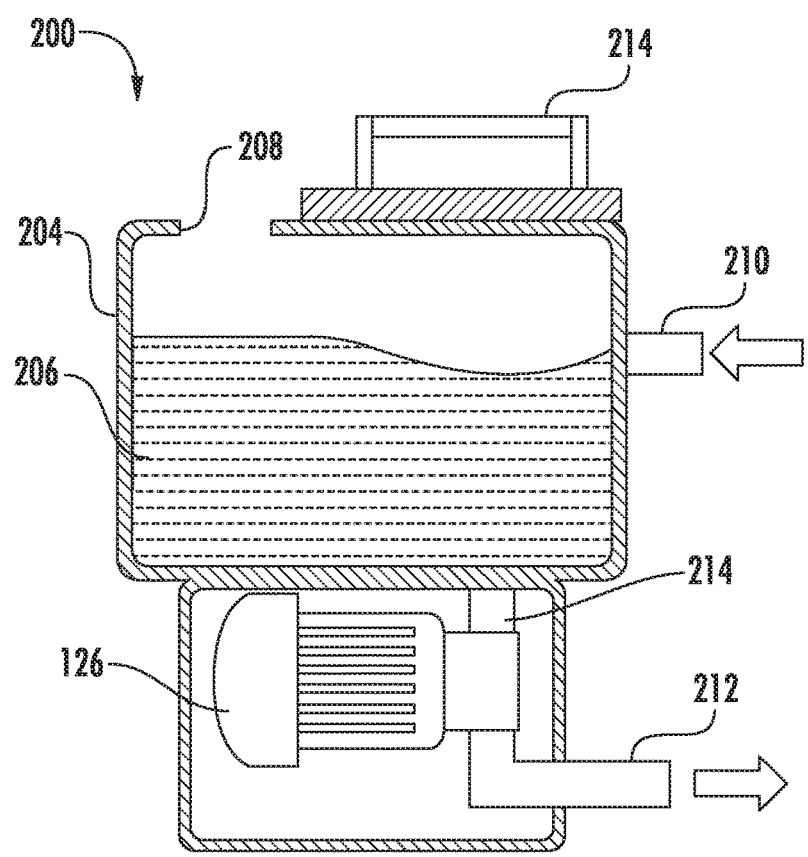

FIGS. 3A and 3B depict example water baths, reservoirs or reaction vessels configured to be used with the disclosed chillers. Water baths 200 (FIG. 3A) and 202 (FIG. 3B) can in some embodiments be configured to contain a liquid or other cooling medium 206 in a closed compartment, e.g. rectangular, square or other suitable shape, with exterior walls 204, e.g. a bottom, side walls and optionally a top, to create the container. In some embodiments water baths 200 and 202 can comprise an opening 208 configured to receive or otherwise allow heat exchanger 104 to be placed inside water baths 200 and 202 (see FIGS. 4A and 4B). In some embodiments water baths 200 and 202 can comprise an inlet 210 and outlet 212 configured to allow cooling medium 206 to flow into and out of water baths 200 and 202. In some embodiments water baths 200 and 202 can comprise a handle 214 or other apparatus to facilitate handling and movement of the water bath by a user, even when full of cooling medium 206.

Water bath 200 as depicted in FIG. 3A does not have a built in pump while the version depicted in FIG. 3B does have an integrated pump 126. Pump 126 can be positioned adjacent to and/or underneath water bath 202 and connected to the interior via conduit 214 to facilitate pumping of cooling medium 206 from water bath 202 to outlet 212.

Figure 4A:
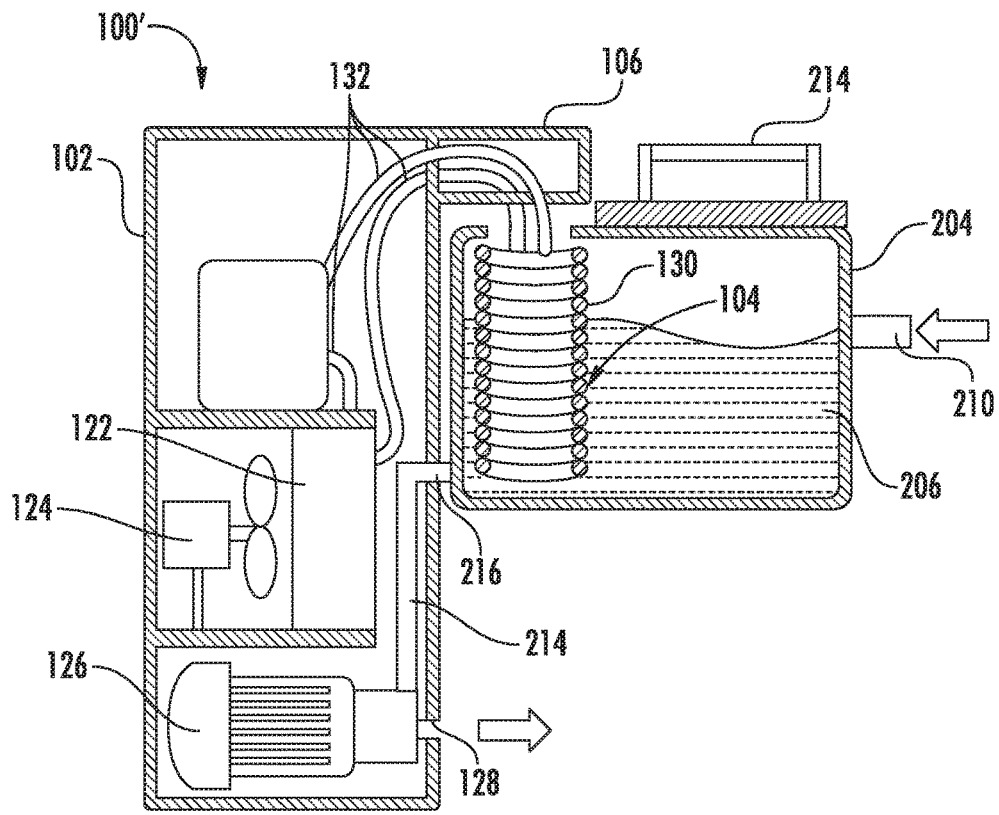
FIGS. 4A and 4B are cross-sectional schematic views of two embodiments of chiller apparatuses and water bath devices as disclosed herein.
Figure 4B:
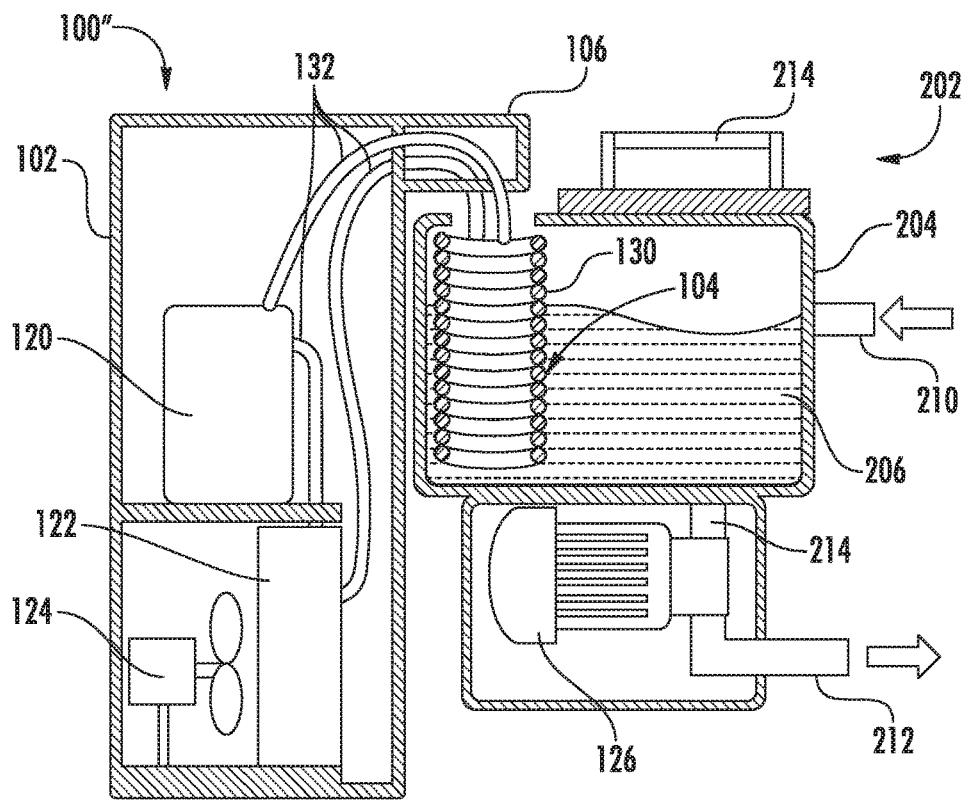

FIGS. 4A and 4B illustrate the use of chillers 100' (FIG. 2A) and 100" (FIG. 2B) with water bath 200 (FIG. 3A) and water bath 202 (FIG. 3B), respectively. In FIG. 4A illustrates the use of water bath 200 (FIG. 3A) with chiller 100' (FIG. 2A). Heat exchanger 104 (including coiled lines 130) is inserted in water bath 200 via opening 208 such that cooling medium 206 is in contact with heat exchanger 104. In some embodiments outlet 212 is connected to pump 126 built into chiller 100' such that cooling medium 206 can be circulated back into water bath 200 via inlet 210 (via a conduit as needed) or pumped to another desired location (via a conduit as needed).

Similarly, in FIG. 4B heat exchanger 104 (including coiled lines 130) is inserted in water bath 202 via opening 208 such that cooling medium 206 is in contact with heat exchanger 104. Since pump 126 is built into water bath 202 circulating cooling medium 206, as needed, can be achieved without the need for such a pump in chiller 100". Cooling medium 206 can be circulated back into water bath 202 via inlet 210 (via a conduit as needed) or pumped to another desired location (via a conduit as needed).

The orientation of chillers 100' and 100" with water baths 200 and 202 in FIGS. 4A and 4B are for illustration purposes only and not intended to be limiting. From a functional standpoint the ability to use heat exchanger 104 in any size, shape or style of water bath, vessel or container is an aspect of the presently disclosed subject matter. Thus, the positioning, orientation or configuration of the water bath or vessel to be cooled can be varied as needed without departing from the scope of the instant disclosure so long as such water bath or vessel can receive heat exchanger 104.

Figure 5C:
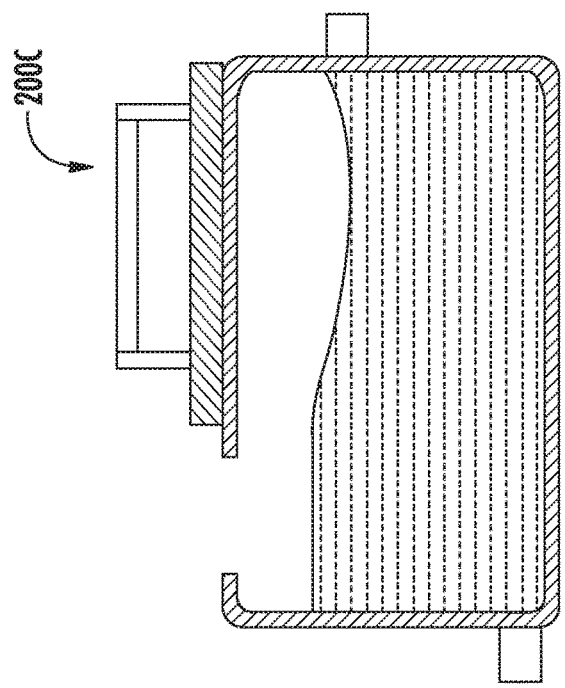
FIGS. 5A, 5B and 5C are cross-sectional schematic views of embodiments of water bath devices as disclosed herein.
Figure 5B:
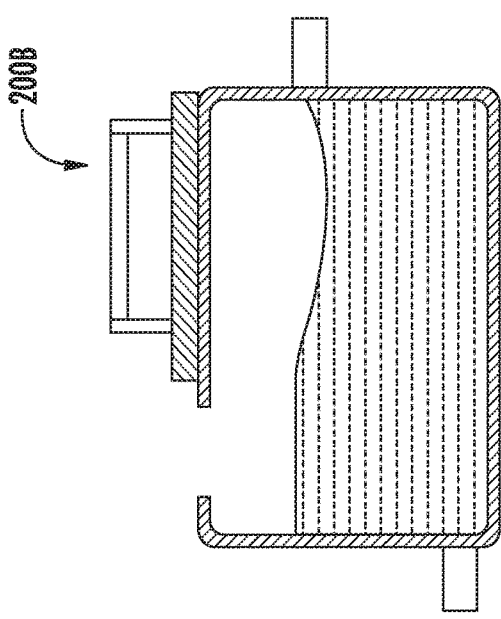
Figure 5A:
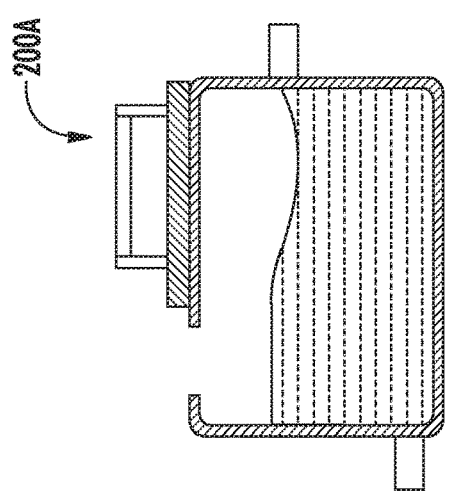

As depicted in FIGS. 5A, 5B and 5C, water baths 200A, 200B, and 200C can be configured in various sizes, all of which can be utilized with chiller 100. In contrast to currently available cooling systems that have integrated water baths of a fixed size, the presently disclosed chillers are configured to be utilized with water baths of various sizes and configurations. This allows the same chiller to be used for multiple applications without requiring the purchase of multiple chillers. Significant cost savings can be realized since it is significantly cheaper to buy one universal chiller and multiple water baths than to buy multiple chillers having varying sizes of water baths. Additionally, as disclosed herein, the disclosed chillers can be used with a plurality of other applications besides cooling water baths. Water baths 200A, 200B, and 200C shown in FIGS. 5A, 5B and 5C are exemplary only and are provided to show their size can vary while still being usable with the disclosed chillers. Additionally, although not depicted in FIGS. 5A, 5B and 5C, such water baths can comprise an integrated pump as shown in FIG. 3B, or any other suitable configuration.

Figure 6A:
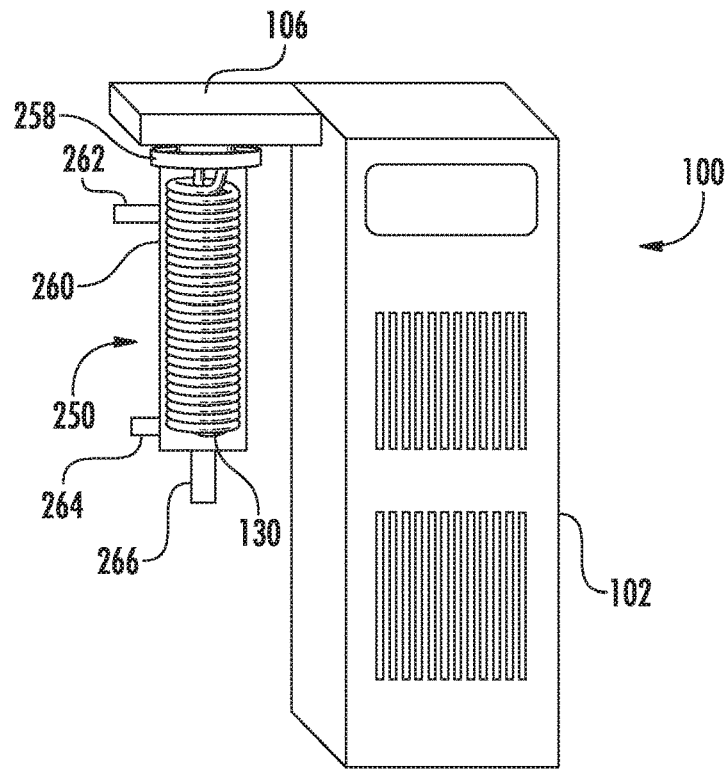
FIGS. 6A through 6D are perspective views of multiple embodiments of chiller apparatuses as disclosed herein.

Chiller 100 is configured to be utilized with a plurality of heat exchanger designs as depicted in FIGS. 6A-6D. By way of example and not limitation, heat exchanger 250, as depicted in FIG. 6A, can comprise a single walled vessel design comprising heat exchanger coils 130, a single-walled enclosure 260 surrounding and enclosing coils 130. Single-walled enclosure 260 can in some embodiments comprise a glass canister configured to slide over heat exchanger coils 130 and securely attach to heat exchange arm 106 to create a sealed enclosure by way of a securing element, including for example collar 258. Single-walled enclosure 260 can be attached to heat exchange arm 106 by a clamp or other attachment mechanism, e.g. threads, screws, bolts, pressure fitting, etc. One or more ports 262, 264, and/or 266 can be provided to allow attachment of one or more conduits or additional instruments/vessels to act as inlets/outlets for compounds/fluids to be cooled and/or condensed. Compounds, vapors or fluids entering single-walled enclosure 260 can come into contact with heat exchange coils 130, or a cooling sleeve surrounding the coils, to thereby cool the compounds, vapors or fluids.

Figure 6B:
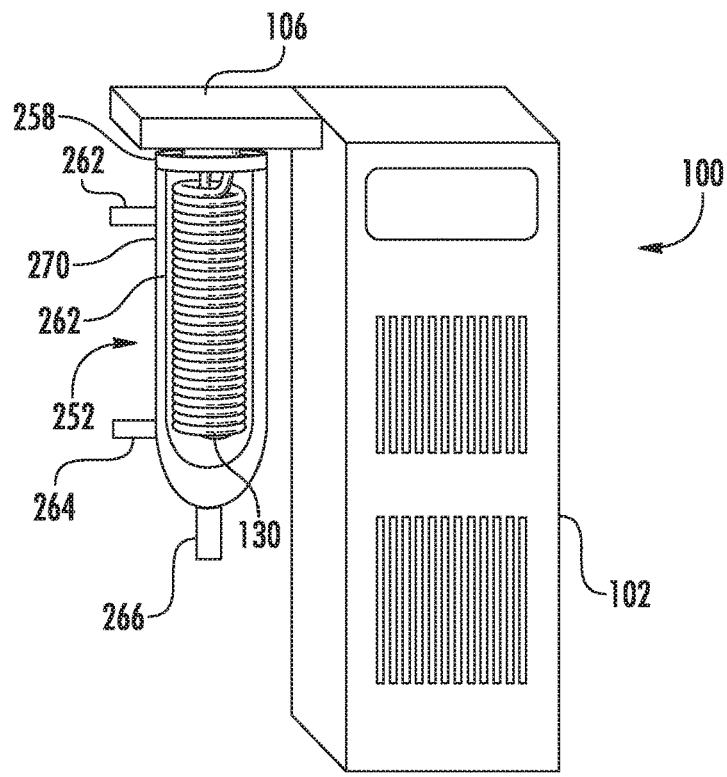

By way of example and not limitation, heat exchanger 252, as depicted in FIG. 6B, can comprise a double-walled vessel design comprising heat exchanger coils 130 enclosed in a double-walled enclosure 270. Double-walled enclosure 270 can in some embodiments comprise a glass canister configured with an inner sleeve 272 configured to slide over heat exchanger coils 130 and securely attach to heat exchange arm 106 to create a sealed enclosure by way of a securing element, including for example collar 258, and/or other attachment mechanism, e.g. threads, screws, bolts, pressure fitting, etc. One or more ports 262, 264, and/or 266 can be provided to allow attachment of one or more conduits or additional instruments/vessels to act as inlets/outlets for compounds/fluids to be cooled. Compounds, vapors or fluids entering double-walled enclosure 270 can come into contact with inner sleeve 272 in the space between double-walled enclosure 270 and inner sleeve 272. Inner sleeve 272 in contact with or close proximity to heat exchange coils 130 can be cooled and thereby cool the compounds, vapors or fluids introduced into double-walled enclosure 270. In this configuration compounds, vapors or fluids to be cooled do not come into direct contact with heat exchange coils 130.

Figure 6C:
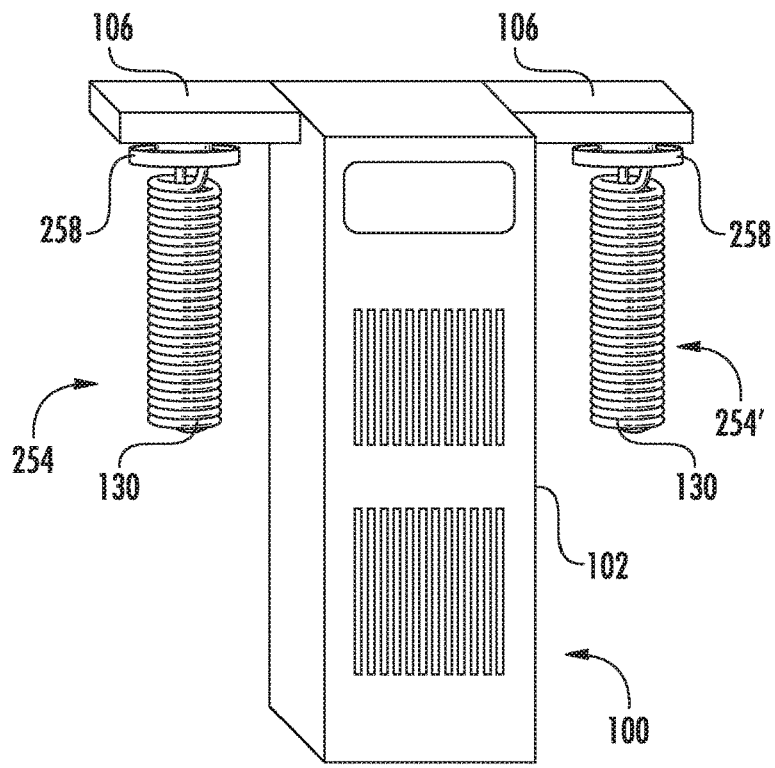
Figure 6D:
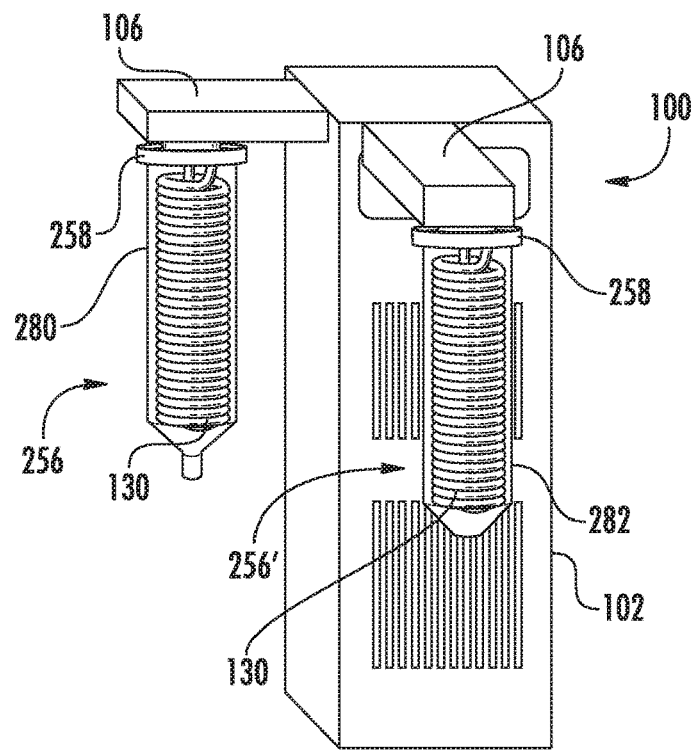

In some embodiments chiller 100 can comprise one or more heat exchangers to increase the cooling capacity and ability to use the same chiller for multiple applications simultaneously. In some embodiments the one or more heat exchangers, such as 254 and 254' in FIG. 6C, can be adapted to run off of the same refrigeration system as shown in FIGS. 2A and 2B. The orientation of heat exchangers 254 and 254' extending from housing 102 can be arranged as desired without departing from the scope of the instant disclosure, including for example from opposing sides of housing 102 as depicted in FIG. 6C. Alternatively, as shown in FIG. 6D, one heat exchanger 256 can extend from a side of housing 102 via heat exchanger arm 106, while a second heat exchanger 256' can extend from a front side of housing 102 via a second exchanger arm 106. Any other orientation, with two or more heat exchangers, is within the scope of the instant disclosure. Moreover, the types of heat exchanger units can be varied from one heat exchanger arm 106 to another, as depicted in FIG. 6D. By way of example and not limitation, heat exchanger 256 can comprise a stainless steel sleeve 280 surrounding coils 130, while heat exchanger 256' can comprise a stainless steel sleeve 282 surrounding coils 130 and having an interior cavity. By providing an adaptable platform the chillers provided herein are suitable for use with numerous types of heat exchanger designs and orientations, and are thereby suitable for use in various laboratory and field applications, as discussed further herein.

FIGS. 7A-7D illustrate an exemplary heat exchanger configured to be used with the disclosed chillers. As depicted in FIG. 1 for example, a heat exchanger system as depicted in FIG. 7A can comprise a coiled lines 130 which can be connected to refrigeration lines through which cooled refrigerant can pass. Coils 130 can have an incoming line for receiving a flow of chilled coolant or refrigerant to pass through the coils, and an outgoing line configured as a conduit for the outgoing coolant or refrigerant after having passed through the coils and acting as a heat exchanger. The incoming line and outgoing line are configured to be connected to the integrated refrigeration system of the chiller. Coiled lines 130 are illustrated as a single looped coil in FIG. 7A, but can also comprise in some embodiments double, triple or more coils. An effect of coiling the refrigerant lines of coiled lines 130 is to increase the surface area for cooling a medium in contact with the coils or in contact with a surface proximate to the coils. Thus, doubling or tripling, for example, the coils in some embodiments can increase cooling capacity of a heat exchanger. Coiled lines 130 can be configured to complete a continuous loop along with the refrigeration system of the chiller, such as depicted in FIGS. 2A and 2B. Coiled lines 130 can be made from a copper tubing material in some embodiments, or alternatively stainless steel, or other suitable metal alloys such as titanium. In some embodiments coils 130 can comprise a titanium material with an inner coating of copper. In some embodiments coils 130 can comprise stainless steel, titanium, and/or a combination thereof.

While in some embodiments coil 130 can be exposed for direct cooling of a medium or evaporate (vapor), in some embodiments, and as depicted in FIGS. 7B, 7C and 7D, it can be concealed by sleeve 280 that can comprise a chemically-resistant vapor trap made of titanium (including commercial pure grade titanium), stainless steel, metal alloys, plastic, glass, rubber, such as neoprene rubber, and/or combinations thereof. Sleeve 280 can comprise a cylindrical housing with a first end having a coupling element 258, including a locking mechanism 284 and collar 282 for securing to heat exchanger arm 106 (see FIG. 1 for example) and securing a housing 300 (see FIG. 7D for example). At an opposing or second end sleeve 280 can comprise a conical or tapered portion 286 terminating in a tip portion 288. As depicted in FIG. 7C, sleeve 280 can be configured to slide over coils 130 so as to be in direct contact or close proximity to the coils, whereby sleeve 280 can be cooled by the refrigerant passing through the coils thereby acting as a heat exchanger with respect to medium and/or vapor coming into contact with sleeve 280.

Housing 300 can comprise a glass vessel enclosing the heat exchanger that includes condenser coil 130 and sleeve 280. Housing 300 can attach to heat exchanger arm 106 by a clamp or other securing mechanism, including coupling element 258 on sleeve 280, to create an air-tight seal. Housing 300 can in some embodiments comprise an entry port 304 for receiving an evaporate, vapor or other medium from a rotary evaporator or other machine, equipment or apparatus, and in some embodiments a second entry port 306. A vacuum port 302 can in some embodiments be provided (in some cases near the top) and configured to receive a vacuum line from a vacuum pump to thereby cause a vacuum on the inner environment of housing 300. An evaporate or vapor that comes into contact with the heat exchanger, and particularly sleeve 280 can condenses into a liquid can collect into collection flask 310 by passing through conduit 308. In some embodiments a joint 312 can be positioned on conduit 308 that can be configured to allow for removal of a collection flask (receiving flask) 310 without breaking a vacuum to the system during operation. Such joint 312 can comprise a valve to maintain the vacuum while removing collection flask 310.

Thus, in some embodiments a heat exchanger used with a chiller as disclosed herein can comprise coiled lines 130, sleeve 280 and/or housing 300. Coils 130 can be configured to fit or slide inside sleeve 280 to form a heat exchanger or "cold finger". Since coiled lines 130 can be fluidly connected to the integrated refrigeration system in the chiller cooled refrigerant can pass through coils 130 causing a cooling effect on sleeve 280. Any medium, evaporate or vapor entering housing 300 can come into contact with the cold surface of sleeve 280 thereby causing the medium to cool and/or the vapor to condense into a liquid to be collected in collection flask 310. The configuration of such a heat exchanger can provide an efficient mechanism for trapping all or substantially all vapors and condensing them such that environmental impacts are lessened.

As depicted in FIGS. 2A and 2B, in order to achieve a stand alone fully integrated system that minimizes space utilization, chiller 100, including mechanical refrigeration system, can be mechanically linked to and fixed with the heat exchanger 104 such that the two are provided in a single unitary device.

Figure 8D:
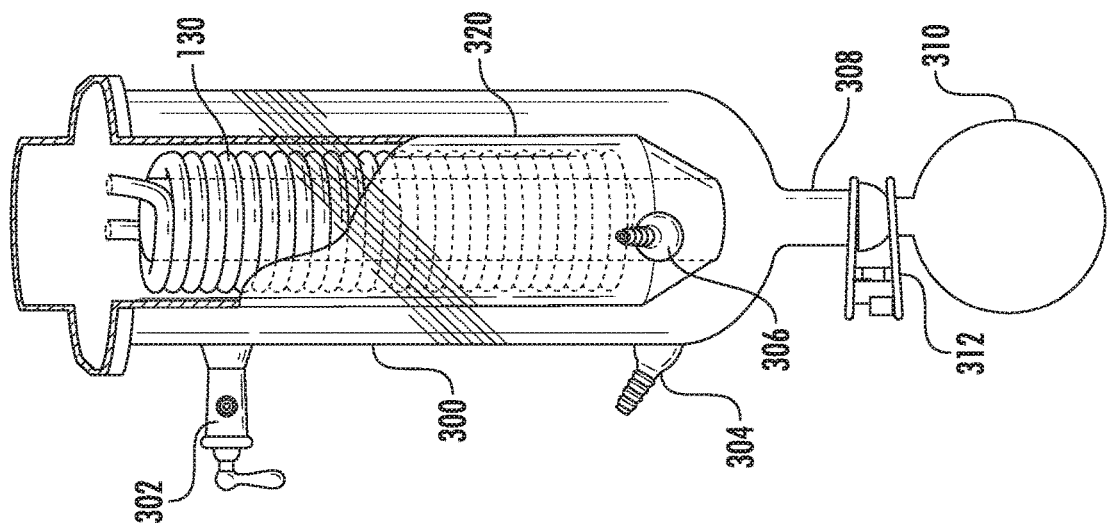
FIGS. 8A through 8D are perspective and partial cut-away views of components of heat exchanger apparatuses as disclosed herein.
Figure 8C:
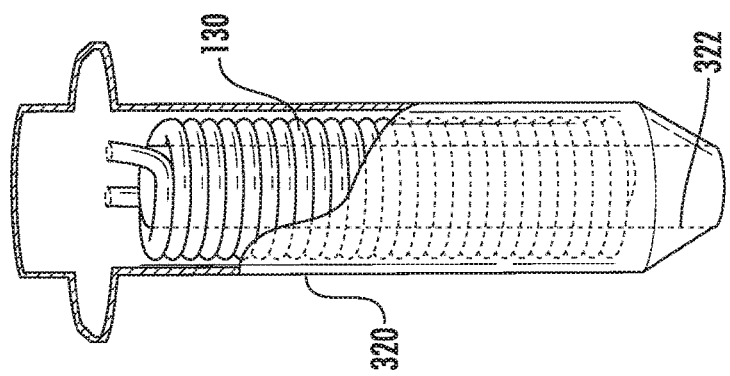
Figure 8B:
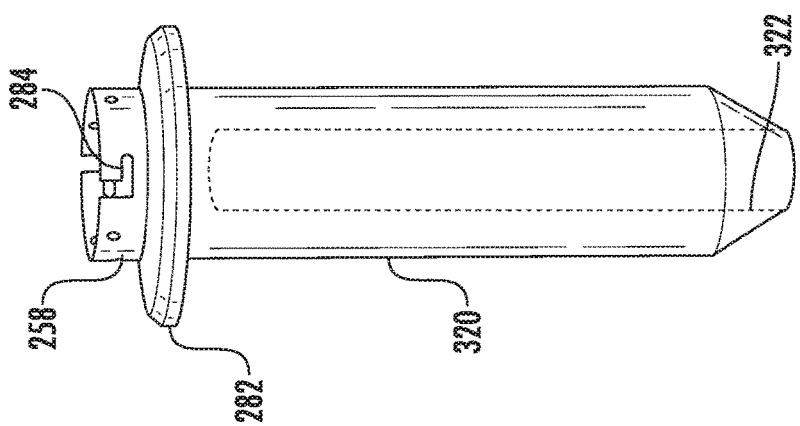
Figure 8A:
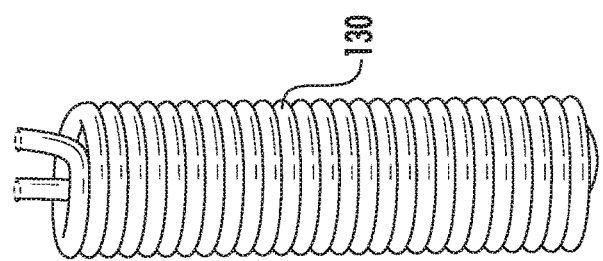

FIGS. 8A-8D illustrate an alternative embodiment of an exemplary heat exchanger configured to be used with the disclosed chillers. As depicted in FIG. 1 for example, a heat exchanger system as depicted in FIG. 8A can comprise coiled lines 130 which can be connected to refrigeration lines through which cooled refrigerant can pass. Coils 130 can have an incoming line for receiving a flow of chilled coolant or refrigerant to pass through the coils, and an outgoing line configured as a conduit for the outgoing coolant or refrigerant after having passed through the coils and acting as a heat exchanger. The incoming line and outgoing line are configured to be connected to the integrated refrigeration system of the chiller. Coiled lines 130 are illustrated as a single looped coil in FIG. 8A, but can also comprise in some embodiments double, triple or more coils. An effect of coiling the refrigerant lines of coiled lines 130 is to increase the surface area for cooling a medium in contact with the coils or in contact with a surface proximate to the coils. Thus, doubling or tripling, for example, the coils in some embodiments can increase cooling capacity of a heat exchanger. Coiled lines 130 can be configured to complete a continuous loop along with the refrigeration system of the chiller, such as depicted in FIGS. 2A and 2B. Coiled lines 130 can be made from a copper tubing material in some embodiments, or alternatively stainless steel, or other suitable metal alloys such as titanium. In some embodiments coils 130 can comprise a titanium material with an inner coating of copper. In some embodiments coils 130 can comprise stainless steel, titanium, and/or a combination thereof.

While in some embodiments coil 130 can be exposed for direct cooling of a medium or evaporate (vapor), in some embodiments, and as depicted in FIGS. 8B, 8C and 8D, it can be concealed by sleeve 320 that can comprise a chemically-resistant vapor trap made of titanium (including commercial pure grade titanium), stainless steel, metal alloys, plastic, glass, rubber, such as neoprene rubber, and/or combinations thereof. Sleeve 320 can comprise a cylindrical housing with a first end having a coupling element 258, including a locking mechanism 284 and collar 282 for securing to heat exchanger arm 106 (see FIG. 1 for example) and securing a housing 300 (see FIG. 8D for example). At an opposing or second end sleeve 320 can comprise a conical or tapered portion terminating with an opening that returns into the interior of sleeve 320 to form an inner cavity 322. Inner cavity 322 can provide additional surface area for a medium, evaporate or vapors to become exposed to the cooling surface of sleeve 320 to thereby increase cooling capacity of the "cold finger".

As depicted in FIG. 8C, sleeve 320 can be configured to slide over coils 130 so as to be in direct contact or close proximity to the coils, whereby sleeve 320 can be cooled by the refrigerant passing through the coils thereby acting as a heat exchanger with respect to medium and/or vapor coming into contact with sleeve 320. Inner cavity 322 can be configured to slide inside the opening in coils 130 as depicted in FIG. 8C.

Housing 300 can comprise a glass vessel enclosing the heat exchanger that includes condenser coil 130 and sleeve 320. Housing 300 can attach to heat exchanger arm 106 by a clamp or other securing mechanism, including coupling element 258 on sleeve 320, to create an air-tight seal. Housing 300 can in some embodiments comprise an entry port 304 for receiving an evaporate, vapor or other medium from a rotary evaporator or other machine, equipment or apparatus, and in some embodiments a second entry port 306. A vacuum port 302 can in some embodiments be provided (in some cases near the top) and configured to receive a vacuum line from a vacuum pump to thereby cause a vacuum on the inner environment of housing 300. An evaporate or vapor that comes into contact with the heat exchanger, and particularly sleeve 320 can condenses into a liquid can collect into collection flask 310 by passing through conduit 308. In some embodiments a joint 312 can be positioned on conduit 308 that can be configured to allow for removal of a collection flask (receiving flask) 310 without breaking a vacuum to the system during operation. Such joint 312 can comprise a valve to maintain the vacuum while removing collection flask 310.

Thus, in some embodiments a heat exchanger used with a chiller as disclosed herein can comprise coiled lines 130, sleeve 320 and/or housing 300, as depicted in FIGS. 8A-8D. Coils 130 can be configured to fit or slide inside sleeve 320 to form a heat exchanger or "cold finger". Since coiled lines 130 can be fluidly connected to the integrated refrigeration system in the chiller cooled refrigerant can pass through coils 130 causing a cooling effect on sleeve 320. Any medium, evaporate or vapor entering housing 300 can come into contact with the cold surface of sleeve 320 thereby causing the medium to cool and/or the vapor to condense into a liquid to be collected in collection flask 310. The configuration of such a heat exchanger can provide an efficient mechanism for trapping all or substantially all vapors and condensing them such that environmental impacts are lessened.

Figure 9:
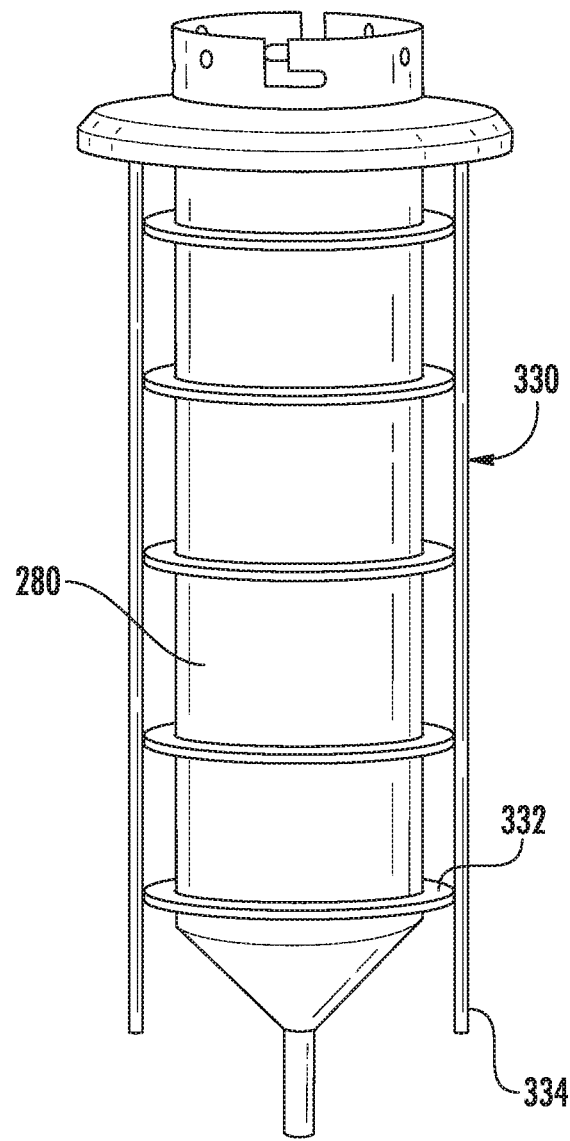
FIG. 9 is a perspective view of an embodiment of a heat exchanger apparatus as disclosed herein.
Figure 10:
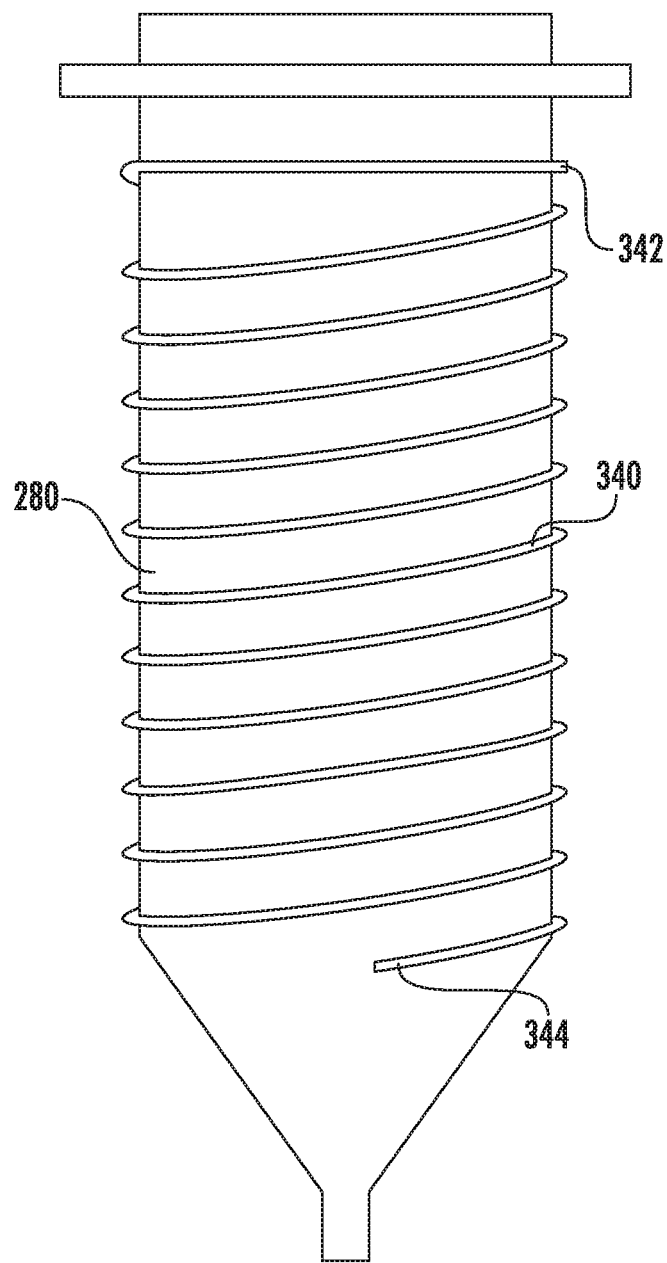
FIG. 10 is a schematic illustration of an embodiment of a heat exchanger apparatus as disclosed herein.
Figure 11:
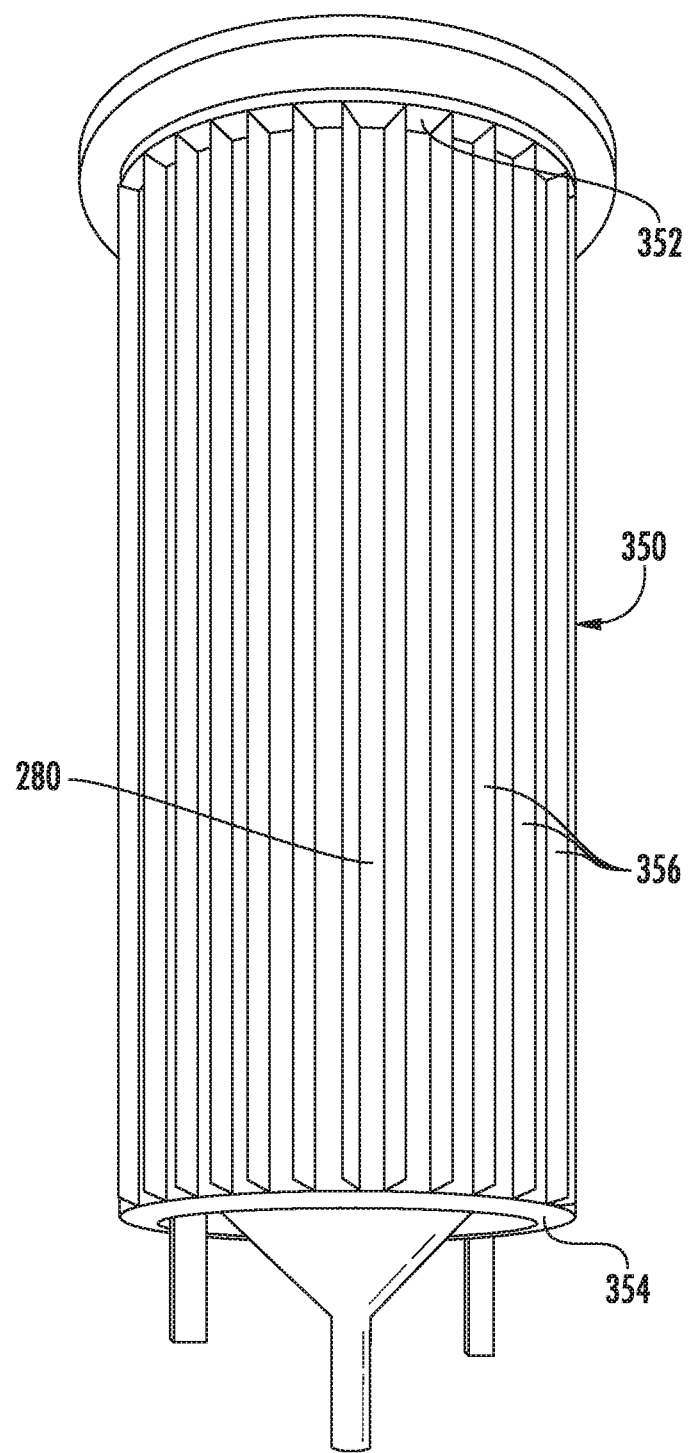
FIG. 11 is a perspective view of an embodiment of a heat exchanger apparatus as disclosed herein.

FIGS. 9-11 depict various devices to be used the disclose heat exchangers to increase the surface area for cooling/heat exchanging. FIG. 9 is an illustration of a ring structure 330 configured to be used with sleeve 280 or 320 (sleeve 280 depicted in FIGS. 9-11). Ring structure 330 can comprise a series of rings 332 or disc-like structures made of a material, e.g. steel, aluminum, stainless steel, copper, etc., and arranged around the cylindrical housing of sleeve 280. Rings 332 can be attached to vertical stays 334 to align and hold them into place along the cylindrical housing of sleeve 280. Due to their contact with or proximity to the cylindrical housing of sleeve 280 rings 332 provide additional surface area for heat exchanging/cooling.

FIG. 10 is an illustration of a fin structure 340 configured to be used with sleeve 280 or 320 (sleeve 280 depicted in FIG. 10). Fin structure 340 can comprise horizontal, substantially horizontal, or angled fins or vanes wrapped around the cylindrical housing of sleeve 280. Fin structure 340 can comprise a continuous wire, tubing or ribbon of material, e.g. steel, aluminum, stainless steel, copper, etc., wrapped around sleeve 280 and affixed at a first end 342 and second end 344 to sleeve 280. In some embodiments, fin structure 340 can be further attached at period locations along the surface of sleeve 280. Due to the contact with or proximity to the cylindrical housing of sleeve 280 fins 340 provide additional surface area for heat exchanging/cooling.

FIG. 11 is an illustration of a vane structure 350 configured to be used with sleeve 280 or 320 (sleeve 280 depicted in FIG. 11). Vane structure 350 can comprise a series of vertical (or substantially vertical) vanes 356 made of a material, e.g. steel, aluminum, stainless steel, copper, etc., and arranged around the cylindrical housing of sleeve 280. Vanes 356 can be attached to an upper disc 352 and lower disc 354 to align and hold them into place along the cylindrical housing of sleeve 280. Due to their contact with or proximity to the cylindrical housing of sleeve 280 vanes 356 provide additional surface area for heat exchanging/cooling.

Figure 12:
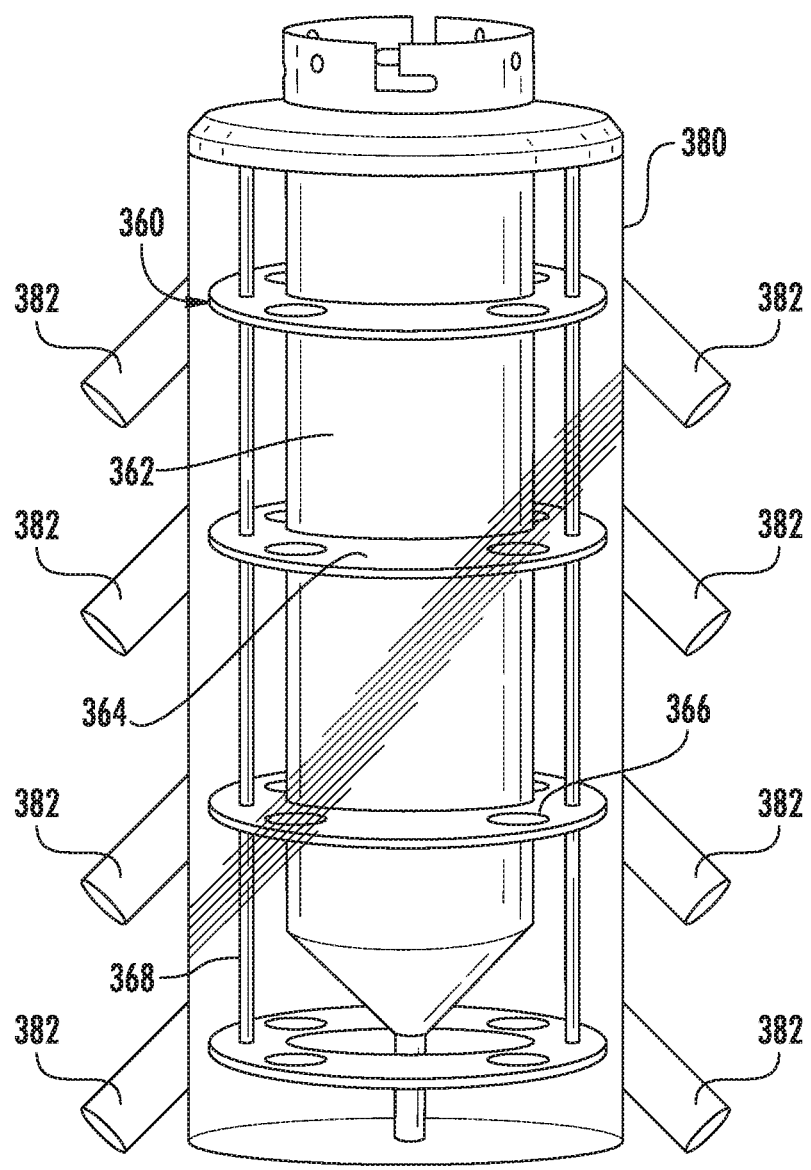
FIG. 12 is a perspective view of an embodiment of a heat exchanger apparatus and freeze dryer as disclosed herein.

FIG. 12 is an illustration of a freeze dryer apparatus 360 configured to be used with sleeve 280 or 320. Freeze dryer apparatus 360 can comprise a cylinder 362 configured to slide over sleeve 280 or 320 (see FIGS. 7 and 8) and a series of rings 364 or disc-like structures made of a material, e.g. steel, aluminum, stainless steel, copper, etc., and arranged around cylinder 362. Rings 364 can be attached to vertical stays 368 to align and hold them into place along cylinder 362. Due to their contact with or proximity to sleeve 280 or 320 rings 364 provide additional surface area for heat exchanging/cooling. Openings 366 can be provided in rings 364, wherein the rings and openings can be configure to hold sample vials, wherein the sample vials can contain a sample to be freeze dried. Freeze dryer apparatus 360 can be configured to reside inside freeze dryer vacuum chamber 380, wherein vacuum chamber 380 can be configured with one or more ports 382 configured to engage one or more sample vials containing a sample to be freeze dried.

Together freeze dryer apparatus 360 and vacuum chamber 380 can be configured to provide a sufficiently cold environment under vacuum such that water in the samples will sublimate from the solid phase to the gas phase. Freeze drying, also known as lyophilisation, lyophilization, or cryodesiccation, is a dehydration method. Freeze drying works by freezing the material and then reducing the surrounding pressure to allow the frozen water in the material to sublimate directly from the solid phase to the gas phase.

Figure 13:
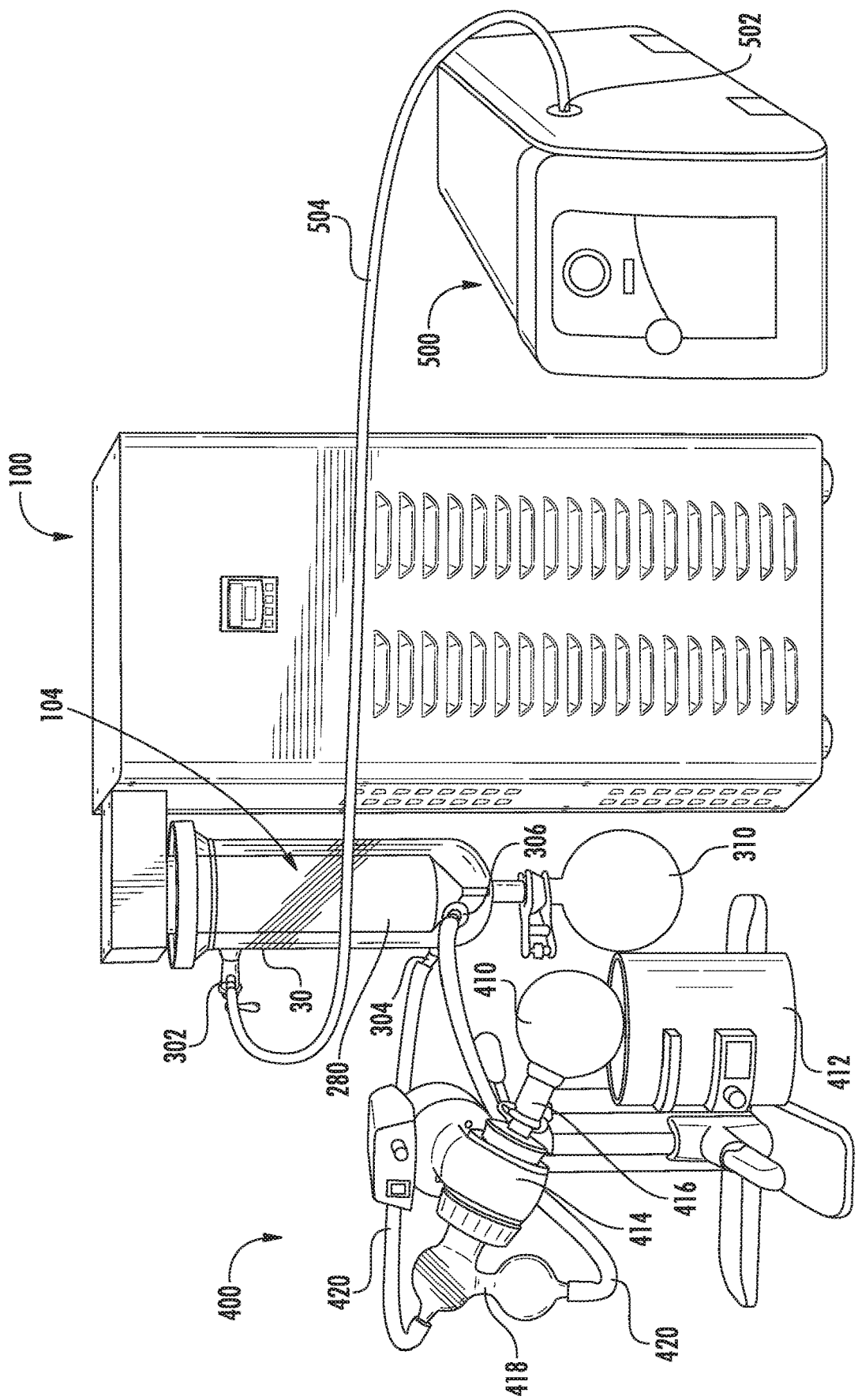
FIG. 13 is a perspective view of an embodiment of a chiller apparatus and rotary evaporator system as disclosed herein.

In some embodiments chiller 100 is configured to be used in conjunction with a rotary evaporator 400 as depicted in FIG. 13. Rotary evaporator 400 can comprise an evaporating (sample) flask 410 configured to be immersed in a water bath 412. Evaporating flask 410 can be rotated using a motor housed in mounting arm 414, with the rotational force provided by the motor being transferred to evaporating flask 410 by rotary joint (vapor duct) 416. Rotary joint 416 can pass/continue through mounting arm 414. Rotary joint 416 provides a conduit through which the evaporate (vapor) from a sample or solvent in evaporation flask 410 can pass into a dummy condenser 418, and into heat exchanger 104 by way of vapor duct 420. Heat exchanger 104 (in any desired configuration as disclosed herein) can be configured to act as a condenser. Once in heat exchanger 104 vapors can be cooled thereby causing them to re-condense and drop into collection flask 310. Collection flask 310 can in some embodiments be removed by a releasable joint which can in some embodiments comprise a valve to maintain the vacuum in heat exchanger/condenser 104 and/or rotary evaporator 400 until collection flask 310 is reattached.

In some embodiments chiller 100 is configured to be used in conjunction with a rotary evaporator 400 simultaneously with a vacuum pump 500 to create a vacuum within the distillation system. For example, in some embodiments vacuum line 504 can connect a vacuum system or pump 500 from a port 502 on the pump to vacuum port 302 on housing 300. In some embodiments vacuum system or pump 500 can be integrated within the housing of chiller 100 or can be a stand alone separate unit as depicted in FIG. 13. With vacuum pump 500 a vacuum or negative pressure can be created on the inner environment of housing 300. An evaporate or vapor that comes into contact with the heat exchanger, and particularly sleeve 280 can condenses into a liquid can collect into collection flask 310.

Rotary evaporators, also referred to in some embodiments as distillers or distillation apparatuses, are used in laboratories throughout the world, for removing solvents from organic and inorganic solutions, to yield a liquid or solid product. Generally, such evaporators or distillers work by placing a sample in a round-bottom flask (referred to as a sample flask or evaporation flask), typically a pear-shaped flask, which spins on an axis at an angle while sitting in a water bath. The flask is attached to a motor, which can include a rotary joint that enables the flask to spin, while permitting the evaporated solvent to flow through the joint (vapor duct) and come into contact with one or more condensers. The condenser(s) can cool the vapor, and the resulting cooled vapor (i.e., liquid) then flows down to a flask below the condenser (a collection flask), where it can be collected.

A water bath can typically be provided to supply sufficient heat to the flask to evaporate the solvent. Typically, the rotor, the motor, the rotary joint, the condenser, the flask used to hold the original solvent, and the flask used to hold the condensed vapor as it is collected, are all connected while the unit is in operation. A mechanical arm is usually provided to raise and lower the connected parts, to bring the flask out of the water bath.

The condenser of the rotary evaporator can be connected to a water source, and water is frequently acceptable to condense the solvent of interest, particularly if the solvent has a relatively high boiling point. Users frequently leave the water flowing through the condenser throughout the day, which results in large volumes of waste water. Further, where the solvent has a particularly low boiling point, it can be advantageous to cool the vapor to temperatures cooler than a water condenser can provide. To only use a water-cooled condenser might create an environmental issue, as a significant volume of volatile organic solvent would not be collected, and could instead enter into the environment.

Particularly when low boiling solvents are used, efforts have been made to improve on the condensation of the vapors so as to trap a significant portion of the solvents. In such cases, one approach is to use a dry-ice condenser, which is packed with dry ice, and, optionally, a solvent that forms a slurry with dry ice to maintain a given temperature (for example, dry ice-acetone maintains a temperature of −78° C.). However, since glass is a poor conductor of heat, the "cold finger" glass of the dry-ice condenser provides warmer than −78° C. cooling surface on which vapors are condensed. Also, in normal laboratory operating temperatures (ambient) dry ice evaporates very fast, which requires constant or frequent replenishing of dry ice in the dry-ice condenser. This is costly, burdensome and negatively impacts productivity.

The chillers provided herein can in some embodiments comprise integrated cooling systems, such as for example a refrigerated condensing unit. Thus, in some embodiments rotary evaporators used in conjunction with the disclosed chillers can be capable of cooling evaporated solvents without using a dry ice trap, a continuous flow of water, and/or a recirculating chiller. By using a mechanically refrigerated cooling/freezing system, or chiller, to provide a cool reservoir capable of condensing vapors arising from solvent evaporation the waste of a continuous flow of water can be avoided, and the use of dry ice and compatible solvents such as acetone and isopropyl alcohol can be avoided, both of which provide for a more environmentally friendly alternative to existing rotary evaporators. Moreover, the configuration and design of the disclosed chillers provides for the use of refrigeration cooling/heat exchange system in an integrated and compact design, particularly as compared to existing cooling devices with built-in water baths that comprise multiple components and require substantially more space to operate.

A rotary evaporator can in some aspects comprise a sample container, such as a sample flask, which is rotated integrally with a rotary joint. The sample flask can be soaked within a water bath, in some embodiments a heated water bath. The sample flask can be connected to one end of the rotary joint through a vapor duct that can be insertedly supported by a rotor of a motor through a sleeve. On the other side of the rotary joint there can in some embodiments be one or more condensers connected by a vapor duct to receive and thereby condense vapors evaporated from the sample flask.

In some embodiments a main body of the motor can be structured by a stator and a motor housing. As the motor is engaged, for example by supplying a current to the motor, a rotational force can be applied to the sample flask within the water bath through the rotary joint. In some embodiments the rotary joint can be insertedly supported by the sleeve in an insertion area. The sleeve can be fixed in engagement with the motor rotor. Furthermore, the sleeve can be rotatably supported by the motor main body at both ends thereof by bearings or the like. In some aspects a fastening member can be arranged within the sleeve for engaging and fastening the rotary joint (vapor duct) to the sleeve. The fastening member can comprise a fastening cap engaged with the sleeve. In some aspects the a coupling member can comprise a plurality of bushes slidably mounted on the outer peripheral surface of the rotary joint and an elastically deformable O-ring disposed between the bushes so that the O-ring can be pressured by the fastening force through the bushes such that the O-rings can be tightly contacted to the outer peripheral surface of the rotary joint and to the inner surface of the sleeve by elastic deformation. An air tight seal can be created at the junction of the rotary joint and rotational motor.

The rotation of the motor rotor can be transmitted to the rotary joint to rotate the rotary joint and thereby rotate the sample container or sample flask. Where the sample flask is at least partially submerged within the water heated water bath the sample can be evaporated and steam or vapor generated within the sample container. This evaporate can then pass through the rotary joint (vapor duct) and to the condenser.

Once at the condenser the evaporate or vapor can come into contact with a cooled surface, such as for example a heat exchanger, to thereby cause the evaporate or vapor to cool and condense into a liquid. Once in liquid form the condensed sample drips or falls by way of gravity into a collection flask positioned below the condenser. In some aspects the condenser can comprise a joint or other conduit to connect the condenser to a collection flask. The condenser can in some embodiments also comprise a port, tube or hose configured to connect the condenser to a vacuum line, such that the sample or solvent of interest can be evaporated under vacuum. The vacuum can in some embodiments be applied near the top of the condenser to provide the maximum opportunity for the vapor to be cooled, thus minimizing the opportunity that solvent vapors will pass on to the vacuum system, such as to the vacuum pump or vacuum trap.

Figure 14:
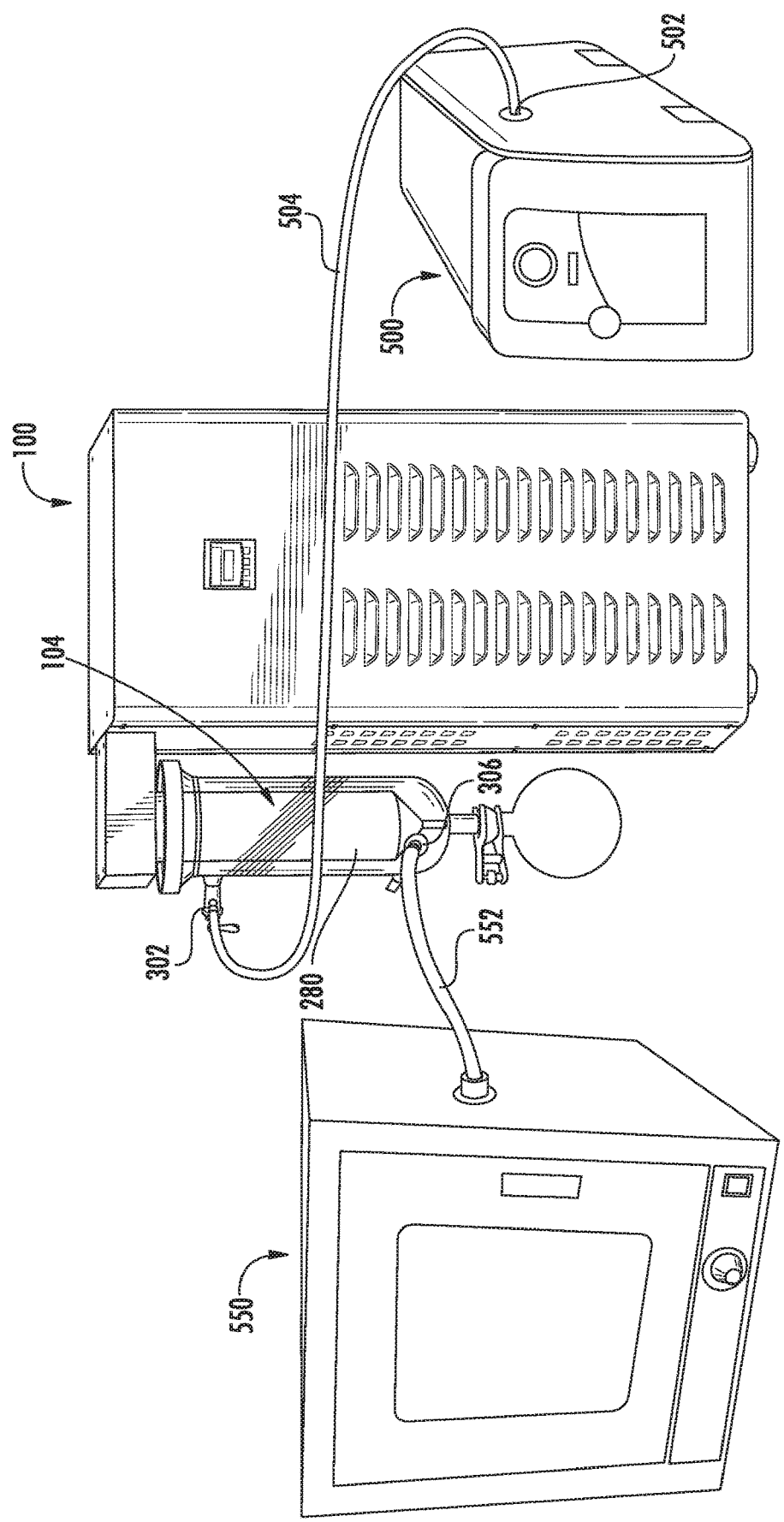
FIG. 14 is a perspective view of an embodiment of a chiller apparatus and vacuum oven system as disclosed herein.

In some embodiments chiller 100 is configured to be used in conjunction with a vacuum oven 550 as depicted in FIG. 14. Vacuum oven 550 can comprise an oven configured to receive samples in a vacuum chamber and can be attached to heat exchanger 104 by conduit 552. Samples to be dried are placed in the oven chamber at the desired drying temperature. Vacuum is applied to the system and vapors (evaporates) from the samples in the oven are condensed by heat exchanger 104. Vacuum ovens are used for further drying of samples to remove any residual solvents (or undesired liquids) that are left in samples. Vacuum ovens have a sample heating chamber where samples are placed there are ports to connect tubing to a condenser and vacuum release. To prevent fumes and vapors from entering into the vacuum pump and environment, condenser (heat exchanger 104) or chiller 100 can be connected between the vacuum oven and vacuum pump. Any vapor from the vacuum oven is condensed by chiller 100. In some embodiments chiller 100 is configured to be used in conjunction with a vacuum oven 550 simultaneously with a vacuum pump 500 to create a vacuum within the system. For example, in some embodiments vacuum line 504 can connect a vacuum system or pump 500 from a port 502 on the pump to vacuum port 302 on housing 300. In some embodiments vacuum system or pump 500 can be integrated within the housing of chiller 100 or can be a stand alone separate unit as depicted in FIG. 14. With vacuum pump 500 a vacuum or negative pressure can be created on the inner environment of housing 300.

Figure 15:
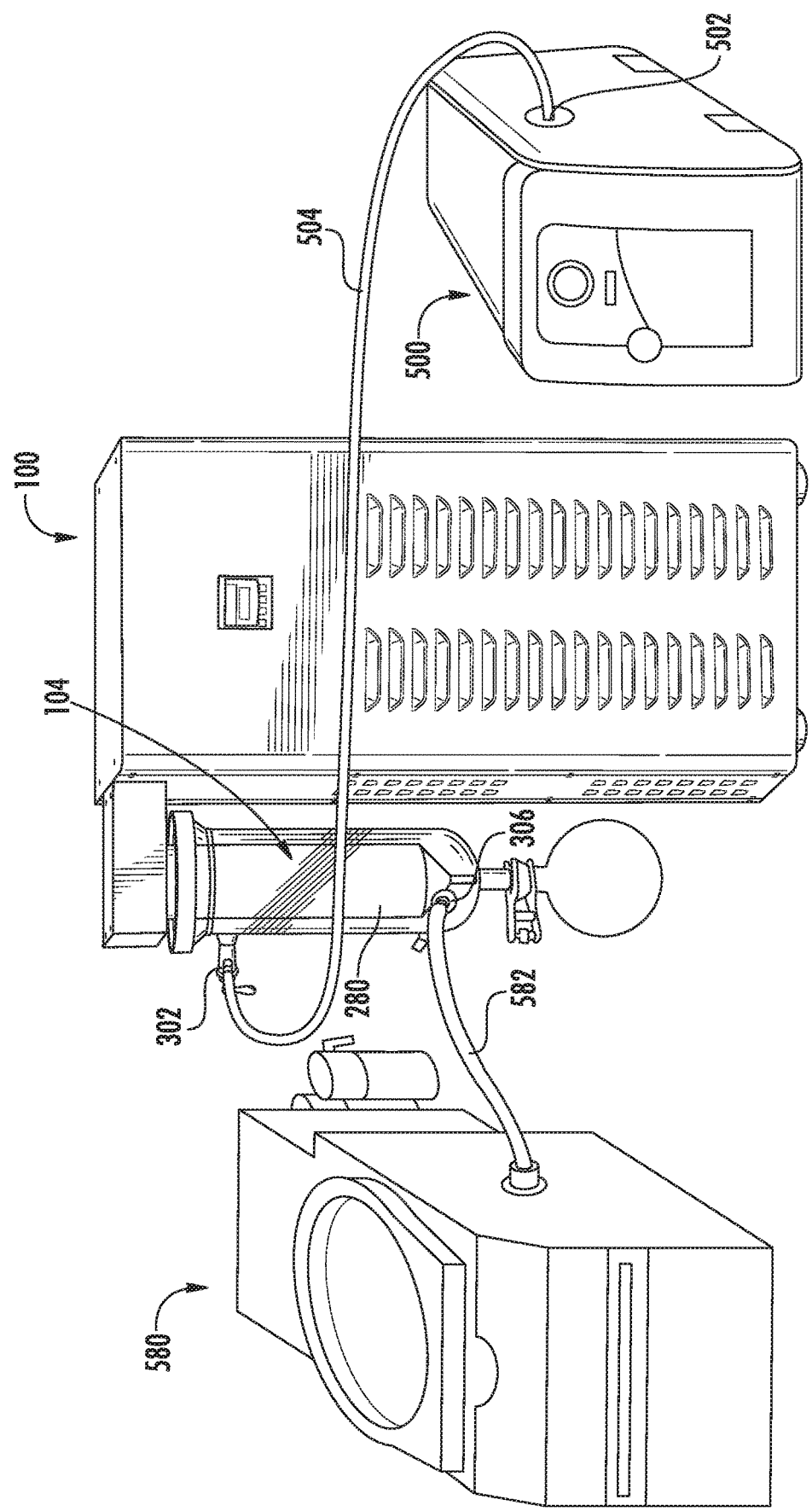
FIG. 15 is a perspective view of an embodiment of a chiller apparatus and centrifugal concentrator system as disclosed herein.

In some embodiments chiller 100 is configured to be used in conjunction with a centrifugal concentrator 580 as depicted in FIG. 15. Centrifugal concentrator 580 can comprise a centrifuge configured to operate under centrifugal force to separate solids from liquid phase, reducing the final volume. In some embodiments, centrifugal concentrator 580 can be used, for example, for protein extraction and purification, DNA concentration, buffer exchange, and deproteinization. By connecting centrifugal concentrator 580 to heat exchanger 104 by conduit 582 vapors (evaporates) from samples in centrifugal concentrator 580 are condensed. Centrifugal concentration is the process of concentrating samples by spinning the sample vials under vacuum and the resulting vapors (evaporates) that are pulled by the vacuum pump are condensed (vapors turned into liquid) by a condenser (heat exchanger 104). In some embodiments this prevents the evaporates from entering the vacuum pump and/or the environment.

In some embodiments chiller 100 is configured to be used in conjunction with a centrifugal concentrator 580 simultaneously with a vacuum pump 500 to create a vacuum within the system. For example, in some embodiments vacuum line 504 can connect a vacuum system or pump 500 from a port 502 on the pump to vacuum port 302 on housing 300. In some embodiments vacuum system or pump 500 can be integrated within the housing of chiller 100 or can be a stand alone separate unit as depicted in FIG. 14. With vacuum pump 500 a vacuum or negative pressure can be created on the inner environment of housing 300.

In some embodiments chiller 100 can help protect the accessory vacuum pump from the corrosive effects of vapors and fumes as they evaporate from the samples. Chiller 100 can provide protection from low freezing point solvents. In some embodiments the term "cold trap" is used to describe condensation of vapors and fumes evaporating from samples under centrifugal force.

Likewise, in some embodiments chiller 100 and related components disclosed herein can be with gel dryers, DNA sample concentration, and/or acid sample concentrations (heat exchanger 104 is resistant to acids). Similar to the other embodiments disclosed herein, chiller 104 can provide to these applications a cooling capacity to cool reactions and/or condense evaporates (vapors). Given the universal and stand alone nature of the disclosed chiller 100 it is configured to be used with a plurality of laboratory components and/or systems requiring a cooling effect and/or condenser capacity.

In some embodiments the chillers, cooling devices and related apparatuses provided herein can be used in methods of cooling materials, liquids, vapors, evaporates and other mediums. By way of example and not limitation, methods are provided for condensing an evaporate, such as from a rotary evaporator, including providing a chiller, providing a rotary evaporator, evaporating a sample via the rotatory evaporator, and condensing the evaporate using a chiller and/or cooling system/apparatus as disclosed herein. As another example, a tankless chiller as provided herein can be used in a method of cooling a sample or reaction, including providing a tankless chiller, providing a separate water bath of a desired size and configuration suitable for the reaction cooling, and aligning the chiller (with external heat exchanger) and water bath such that the water bath is cooled by the chiller to thereby cool the sample/reaction. Similar methods using the disclosed cooling systems and accompanying laboratory/research equipment, as would be appreciated and understood by one of ordinary skill in the art, are provided herein.

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in this application, including the claims. Thus, for example, reference to "a cell" includes a plurality of such cells, and so forth.

Unless otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value or to an amount of a composition, dose, sequence identity (e.g., when comparing two or more nucleotide or amino acid sequences), mass, weight, temperature, time, volume, concentration, percentage, etc., is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

The term "comprising", which is synonymous with "including" "containing" or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A chiller apparatus configured to cool a liquid, vapor or other medium, comprising:
    a condenser;
    a compressor;
    a temperature controller;
    a heat exchanger; and
    a heat exchanger arm extending to a side of a housing, wherein the heat exchanger arm supports the heat exchanger from above in a fixed position relative to the housing, wherein heat exchanger arm further comprises a coupling element for attaching a vessel that surrounds the heat exchanger, wherein the vessel contains the liquid, vapor or other medium to be cooled in close proximity to the heat exchanger;
    wherein the condenser, compressor and temperature controller are contained inside the housing, wherein the heat exchanger is external to the housing,
    wherein the heat exchanger is configured to be exposed to the liquid, vapor or other medium contained within the vessel attachable to the coupling element, and from which heat is to be removed by the heat exchanger,
    wherein the condenser, compressor, temperature controller and heat exchanger are integrated into a single stand alone chiller apparatus.

2. The chiller of claim 1, wherein the heat exchanger is positioned outside of the housing but affixed to the housing and configured to be submerged or placed in the vessel.

3. The chiller of claim 1, wherein the heat exchanger, condenser and compressor further comprise a refrigerant, and wherein the heat exchanger, condenser and compressor are in fluid communication with one another and configured to circulate the refrigerant.

4. The chiller of claim 1, further comprising the vessel that is attachable to the coupling element of the heat exchanger arm.

5. The chiller of claim 1, wherein the chiller apparatus achieves a cooling temperature range of +40° C. to −150° C.

6. A chiller system configured to cool a liquid, vapor or other medium, comprising:
    a condenser;
    a compressor;
    a temperature controller;
    a heat exchanger;
    a heat exchanger arm extending to a side of a housing, wherein the heat exchanger arm supports the heat exchanger from above in a fixed position relative to the housing; and
    a vessel containing the liquid, vapor or other medium to be cooled attached to the heat exchanger arm and the heat exchanger arm supports the attached vessel from above, wherein the vessel contains the liquid, vapor or other medium to be cooled in close proximity to the heat exchanger,
    wherein the condenser, compressor and temperature controller are contained inside the housing, wherein the heat exchanger supported from the heat exchanger arm is external to the housing, wherein the heat exchanger is configured to be exposed to the liquid, vapor or other medium contained within the vessel, and from which heat is to be removed by the heat exchanger,
    wherein the heat exchanger is positioned outside of the housing but affixed to the housing by way of the heat exchanger arm and configured to be submerged or placed in the vessel.

7. The chiller of claim 6, wherein the chiller system achieves a cooling temperature range of +40° C. to −150° C.

* * * * *